(12) United States Patent
Koermer et al.

(10) Patent No.: US 6,548,446 B1
(45) Date of Patent: *Apr. 15, 2003

(54) CATALYST FOR SELECTIVE OXIDATION OF CARBON MONOXIDE

(75) Inventors: Gerald S. Koermer, Roseland, NJ (US); Linda Hratko, Colonia, NJ (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,483

(22) Filed: Jul. 2, 1997

(51) Int. Cl.$^7$ ............................ B01J 23/18; B01J 23/40; B01J 23/42; B01J 23/46
(52) U.S. Cl. ................. 502/249; 502/304; 502/308; 502/309; 502/325; 502/332; 502/333; 502/334; 502/339; 502/353
(58) Field of Search .................. 502/249, 304, 502/332, 349, 325, 353, 354, 339, 308, 309, 333, 334

(56) References Cited

U.S. PATENT DOCUMENTS

| | | | | |
|---|---|---|---|---|
| 3,940,329 A | | 2/1976 | Wilhelm | 208/139 |
| 3,994,832 A | * | 11/1976 | Antos et al. | 502/353 |
| 4,025,606 A | | 5/1977 | Acres | 423/245 |
| 4,110,254 A | * | 8/1978 | Lauder | 502/332 |
| 4,146,458 A | * | 3/1979 | Horowitz et al. | 502/325 |
| 4,171,288 A | | 10/1979 | Keith et al. | 502/304 |
| 4,604,275 A | | 8/1986 | Murib | 423/247 |
| 4,714,694 A | | 12/1987 | Wan | 502/304 |
| 4,977,129 A | * | 12/1990 | Ernest | 423/213.5 |
| 5,015,461 A | | 5/1991 | Jacobson et al. | 423/593 |
| 5,045,297 A | | 9/1991 | Bonifaz et al. | 423/437.2 |
| 5,057,483 A | | 10/1991 | Wan | 502/304 |
| 5,157,204 A | | 10/1992 | Brown et al. | 585/850 |

FOREIGN PATENT DOCUMENTS

| | | | |
|---|---|---|---|
| FR | 1.231.071 | 9/1960 | |
| JP | 05 068887 | 3/1993 | ............ B01J/29/06 |

OTHER PUBLICATIONS

Preparation of Zirconia–Ceria Powder...With Urea; E. Luccini et al; Int. J. of Materials and Product Technology vol. 4, No. 2, pp. 167–175, 1989, no month.
Thermal Sensors; Principles of Chemical Sensors; pp. 51–53; Chapter 2; Platinum Press, 1989, no month.
M. Haruta et al; Low–Temperature Oxidation . . . and $CO_3O_4$ Journal of Catalysis 144; 1993; pp. 175–191.
G. Hoflund et al; Au/$MnO_x$ Catalytic Performance . . . Oxidation; Applied Catalysis B: Environmental 6 (1995) 117–126.
G. Srinivas et al; Au/Metal Oxides . . . CO Oxidation; Stud. Surf. Sci. Catal.; 1996; vol. 101; pp. 427–433.
B. Kennedy; Structure Trends in Bi . . . of $Bi_2Rh_2O_{7-8}$ Materials Research Bulletin; vol. 32, No. 5, pp. 479–483, 1997.
E. Beck et al; "Investigation of Superconductivity . . . Oxides" Journal of the Less–Common Metals, 147 (1989), L17–L20.
J.M. Longo et al; "Preparation and Structure . . . $BiRhO_{3\text{-}x}$ System" Mat. Res. Bull.; vol. 7, pp. 137–146; 1972.

* cited by examiner

Primary Examiner—Stanley S. Silverman
Assistant Examiner—Christina Ildebrando
(74) Attorney, Agent, or Firm—Richard A. Negin

(57) ABSTRACT

A selective catalytic material is used in a method for selective oxidation of carbon monoxide in the presence of hydrocarbons and contains rhodium and a bismuth component either as a supported catalytic material dispersed on a refractory inorganic oxide support or as an unsupported catalytic material prepared, for example, by co-precipitation from a solution containing dissolved bismuth and rhodium salts. The bismuth and rhodium components are present in amounts that provide an atomic ratio of bismuth to rhodium in the range of from about 0.1:1 to 10:1, e.g., from about 1:1 to 2.5:1. The selective catalytic material is contacted under oxidizing conditions with a gas stream containing carbon monoxide and hydrocarbons. The selective catalytic material (24a) may be disposed on a sensor (24) disposed within a conduit (18) downstream of a conventional treatment catalyst (16) to evaluate the performance of the latter by measuring the extent of carbon monoxide oxidation catalyzed by the selective catalytic material (24a) in the treated gas.

19 Claims, 11 Drawing Sheets

- CO
- C3(=+S)

- CO
- C3(=+S)

aged 24h 700 C Air/Steam

CATALYST FOR SELECTIVE OXIDATION OF CARBON MONOXIDE

BACKGROUND OF THE INVENTION

1. Field of the Invention

The present invention relates to an oxidation catalyst useful for promoting the selective oxidation of carbon monoxide to carbon dioxide in the presence of hydrocarbons, and to a method of using the catalyst to selectively oxidize carbon monoxide in the presence of hydrocarbons.

It is often desired to reduce or eliminate the carbon monoxide content of gas streams containing hydrocarbons and carbon monoxide without significantly reducing the hydrocarbon content of the gas stream. The selective catalytic oxidation of carbon monoxide to carbon dioxide in the presence of hydrocarbons would be useful, for example, in removing carbon monoxide from process gas streams containing valuable hydrocarbons and in gauging the performance of catalysts used to treat exhaust or other waste gas streams, as described below.

2. Related Art

It is known in the art to utilize catalysts comprising platinum and bismuth components dispersed on zirconia-silica supports or titania-silica supports to catalyze the selective oxidation of carbon monoxide in the presence of sulfur compounds such as sulfur dioxide. These selective catalyst compositions are known to be useful to promote the oxidation of carbon monoxide while reducing or inhibiting the oxidation of sulfur dioxide to sulfur trioxide.

U.S. Pat. No. 5,157,204 to Brown et al, issued Oct. 20, 1992, discloses a platinum-containing catalyst for use in removing carbon monoxide and free oxygen from hydrocarbon-containing streams by contacting the stream with at least one platinum-containing catalyst composition at a reaction temperature in the range of about −30° C. to about 200° C. The catalyst compositions are said to consist essentially of platinum metal, iron oxide and an inorganic support including, among others, titania, alumina, zirconia and vanadia. Other catalyst compositions are said to consist essentially of platinum metal, palladium metal, at least one manganese compound and a tin-dioxide coated ceramic carrier. Another class of catalyst compositions is said to consist essentially of platinum metal, palladium metal, at least one manganese compound, at least one chromium compound and the tin-dioxide coated ceramic carrier.

U.S. Pat. No. 4,604,275 to Murib, issued Aug. 5, 1986, discloses a method for selectively oxidizing carbon monoxide in a hydrocarbon stream employing a supported catalyst containing cobalt oxide, the catalyst being prepared by impregnating an alumina support with an aqueous solution of a water-soluble alkaline compound whose anion is capable of forming a water-insoluble cobalt compound upon reaction with a water soluble cobalt compound.

SUMMARY OF THE INVENTION

In accordance with the present invention there is provided a selective catalytic material for selectively oxidizing carbon monoxide in a gas stream containing a hydrocarbon component in addition to the carbon monoxide. The catalytic material comprises a catalytically effective amount of rhodium, and a bismuth component present in an amount sufficient to inhibit the oxidation of the hydrocarbon component when the selective catalytic material is contacted under oxidizing conditions with such gas stream.

In one aspect of the present invention, the selective catalytic material is unsupported, for example, the rhodium and the bismuth component are combined in a co-precipitate obtained from a solution of a soluble bismuth salt and a soluble rhodium salt. In a related aspect of the present invention, the co-precipitate has been calcined in an oxidizing gas, e.g., air, at a temperature of at least about 750° C.; for example, in a specific aspect the solution is an aqueous solution, the co-precipitate is obtained by evaporating the solution to dryness, and the co-precipitate is calcined at a temperature of from about 750° C. to 950° C.

In accordance with another aspect of the present invention, there is provided a supported selective catalytic material for selectively oxidizing carbon monoxide in a gas stream containing a hydrocarbon component in addition to the carbon monoxide. The supported catalytic material comprises the following components. A refractory inorganic oxide support has dispersed thereon a catalytically effective amount of rhodium, and a bismuth component. The bismuth component, which optionally may comprise $Bi_2O_3$, is dispersed on the support in an amount sufficient to inhibit the oxidation of the hydrocarbon component when the selective catalytic material is contacted under oxidizing conditions with such gas stream. Preferably, the rhodium and the bismuth component are dispersed on the same increment of support. While any suitable support may be used, a zirconia support is preferred.

Optionally, a catalytically effective amount of one or more platinum group metals other than rhodium, e.g., selected from the group consisting of one or more of platinum, palladium, iridium, ruthenium and osmium, preferably platinum, may be included in the selective catalytic material, in addition to the rhodium.

In accordance with one aspect of the present invention, the bismuth component and the rhodium are present in amounts that provide an atomic ratio of bismuth to rhodium (Bi:Rh) in the range of from about 0.5:1 to 4:1, for example, from about 1:1 to 2.5:1.

In another aspect of the present invention, the bismuth component, calculated as elemental bismuth, comprises at least about 0.01 percent by weight, e.g., from about 0.01 to about 50 percent by weight, or from about 1 to about 30 percent by weight, of the supported catalytic material.

Another aspect of the present invention provides a method for selectively oxidizing carbon monoxide in a gas stream containing a hydrocarbon component in addition to the carbon monoxide, the method comprising the following steps. The gas stream is contacted under oxidizing conditions, for example, including a temperature of about 200° C. or higher, with a catalytic material comprising a catalytically effective amount of rhodium and a bismuth component, for example, $Bi_2O_3$, present in an amount sufficient to inhibit the oxidation of the hydrocarbon component.

Another aspect of the invention provides for carrying out the above method by contacting the gas stream under oxidizing conditions with a selective catalytic material selected from one of the following. (1)The first catalytic material comprises a supported catalytic material comprising (a) a refractory inorganic oxide support, (b) a catalytically effective amount of rhodium dispersed on the support, and (c) a bismuth component dispersed on the support. (2) The second catalytic material comprises a co-precipitated catalytic material comprising (a) a catalytically effective amount of rhodium and (b) a bismuth component and obtained by co-precipitation from a solution of a soluble bismuth salt and a soluble rhodium salt; and wherein the bismuth component is present in an amount sufficient to inhibit the oxidation of the hydrocarbon component under the oxidizing conditions.

Other method aspects of the present invention provide for contacting the gas stream under oxidizing conditions with any one of the selective catalytic materials as described above.

Other aspects of the present invention will be apparent from the following detailed description of the invention and specific embodiments thereof.

As used herein and in the claims, the term "oxidizing conditions" means that the gas stream contains at least sufficient oxidant, e.g., oxygen, to oxidize the CO content of the gas stream and is at a temperature which is high enough for the catalyzed carbon monoxide oxidation reaction to take place. The defined term also includes conditions where excess oxygen over the stoichiometric amount required to oxidize all the carbon monoxide is present, and further includes conditions where excess oxygen over the stoichiometric amount required to oxidize all the carbon monoxide plus hydrocarbons in the gas stream is present.

As used herein and in the claims, the term "platinum group metals" means and includes platinum, palladium, rhodium, iridium, ruthenium and osmium.

As used herein and in the claims, the term "stabilized" used with reference to a refractory inorganic oxide support, means that the support has been stabilized against thermal and hydrothermal degradation by incorporation therein of another refractory metal oxide which tends to stabilize the lattice of the support. For example, it is well known in the art to thermally stabilize alumina or zirconia supports by incorporation therein of one or more stabilizing metal oxides such as ceria, lanthana or other rare earth metal oxides. To cite one example, U.S. Pat. No. 4,171,288, issued to C. D. Keith et al, discloses the stabilization of alumina support by the use of stabilizers such as zirconia, titania, alkaline earth metal oxides, such as baria, calcia or strontia or, more usually, rare earth metal oxides, for example, oxides of cerium, lanthanum, neodymium, praseodymium and mixtures of two or more thereof, including the commercially available mixtures of rare earth metal oxides. It is also known to thermally stabilize bulk ceria support with alumina, as disclosed in U.S. Pat. No. 4,714,694 of C. Z. Wan et al. Generally, the stabilizing material is impregnated into the particulate refractory inorganic oxide support via a solution of a soluble salt of the metal of the stabilizing compound. The impregnated support is then dried and calcined to convert the soluble salt, e.g., a nitrate, to the oxide.

As used herein and in the claims, the term "hydrocarbon" or "hydrocarbon component" shall mean and include any hydrocarbons which are susceptible to oxidation by being contacted with an oxidation catalyst under oxidizing conditions. The term includes alkanes, paraffins, alkenes, alkynes, olefins, aromatic compounds and mixtures of two or more thereof.

As used herein and in the claims, a "supported" catalytic material of the present invention is one in which the bismuth and a rhodium components (and any optional metal components) are dispersed on fine particles of a refractory inorganic oxide support. As used herein and in the claims, an "unsupported" catalytic material of the present invention is one in which the bismuth and rhodium components (and any optional metal components) are present as fine particles of the components themselves, such as particles obtained by precipitation of the components from solutions or complexes of salts of the metals of the components.

DETAILED DESCRIPTION OF THE INVENTION AND SPECIFIC EMBODIMENTS THEREOF

Under certain circumstances, it is highly advantageous to be able to oxidize carbon monoxide to carbon dioxide without concomitantly oxidizing hydrocarbons which may be contained in the same gas stream. One practical application is the removal or reduction of carbon monoxide in process gas streams, such as are found in petroleum and petrochemical processing, which also contain valuable hydrocarbons which are not to be oxidized. Another application is to use such technique to determine the amount of unoxidized carbon monoxide present in a gas stream which has been treated by a conventional treatment catalyst to convert noxious components to innocuous ones, and thereby to test the efficacy of pollution treatment of gas streams including combustion waste gas, exhaust gas and other gas streams that contain carbon monoxide and hydrocarbons. The selective catalytic material of the present invention may take one of two basic forms. The first comprises a rhodium component and a bismuth component dispersed upon a suitable refractory inorganic oxide support. Any suitable support may be used although, as described below, a gamma-alumina support has been found to provide poorer selectivity than do other supports, such as zirconia supports. The second is an unsupported catalyst such as may be obtained by co-precipitating the bismuth and rhodium components from a solution of a soluble bismuth salt and a soluble rhodium salt. In this second form, the catalytic material of the present invention is not dispersed upon a refractory inorganic oxide support but comprises, e.g., the co-precipitated material ("co-precipitate") obtained from a solution as described above, and is usually in powder form, although it may be formed as pellets, extrudates or any suitably shaped pieces or dispersed as a coating on a suitable carrier structure. The first form of catalyst is sometimes below referred to as the "supported catalyst" and the second type of catalyst is sometimes below referred to as the "unsupported catalyst". Reference simply to "catalytic material" of the present invention includes both the supported catalyst and the unsupported catalyst.

When catalytic material of the present invention is used to treat a gas stream that contains CO and a hydrocarbon component, the rate at which the hydrocarbon component is oxidized is less than it would be for prior art catalytic materials. This is believed to be the result of combining rhodium and bismuth components in the catalytic material and the ability of the bismuth component to inhibit the oxidation of hydrocarbons. Without wishing to be bound by any particular theory, it is believed that the rhodium catalyzes the oxidation of the carbon monoxide and the bismuth component suppresses concomitant oxidation of the hydrocarbon component.

Figure 1A:
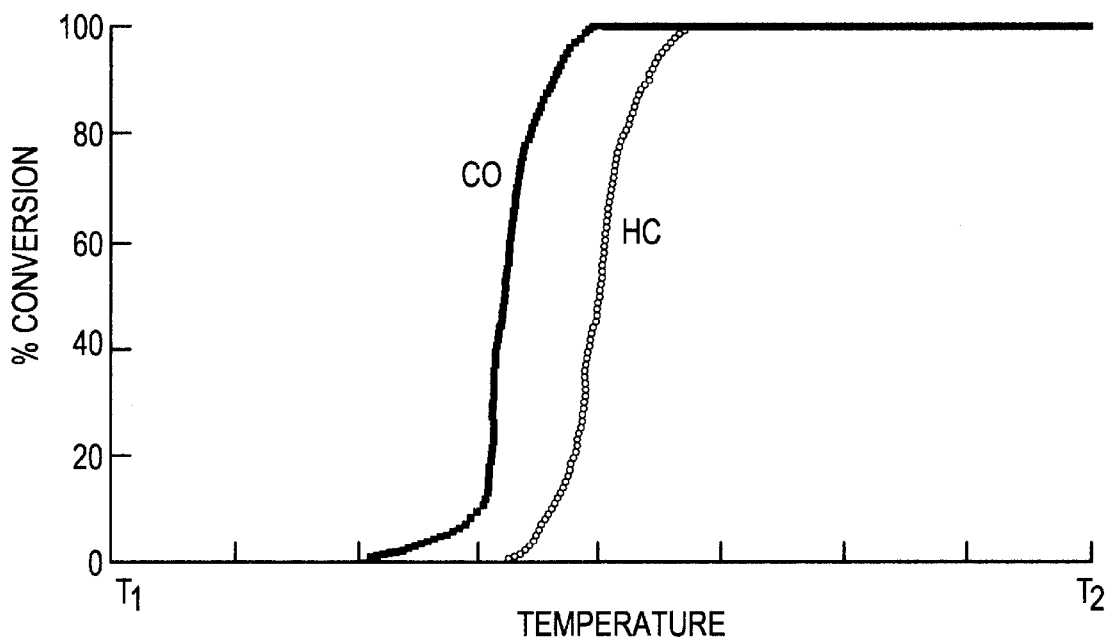
FIG. 1A is a graph showing typical percent conversion versus temperature curves for oxidation of carbon monoxide and $C_3$ hydrocarbons ("conversion curves") in a gas stream contacted under oxidizing conditions with a theoretical non-selective catalytic material.

The following species are ranked in their order of reactivity for catalytic oxidation: carbon monoxide is more reactive than olefins, which are more reactive than aromatics, which are more reactive than alkanes (paraffins). However, at temperatures of about 200° C. or higher, the reactivities under catalytic oxidation conditions of carbon monoxide and olefins approach each other. This means that for most catalytic materials the temperature at which significant carbon monoxide oxidation begins is very close to the temperature at which the oxidation of hydrocarbons, particularly olefins, begins, the latter temperatures being only slightly higher. Stated otherwise, the "light off", or conversion curves, which plot the percentage conversion of carbon monoxide and hydrocarbons against the temperature at which the gas stream is introduced to the oxidation catalytic material, are close together, as is illustrated in FIG. 1A. FIG. 1A shows significant oxidation of hydrocarbon as well as carbon dioxide over a large portion of the temperature range with only a small temperature range over which there is good selectivity for carbon monoxide.

Figure 1B:
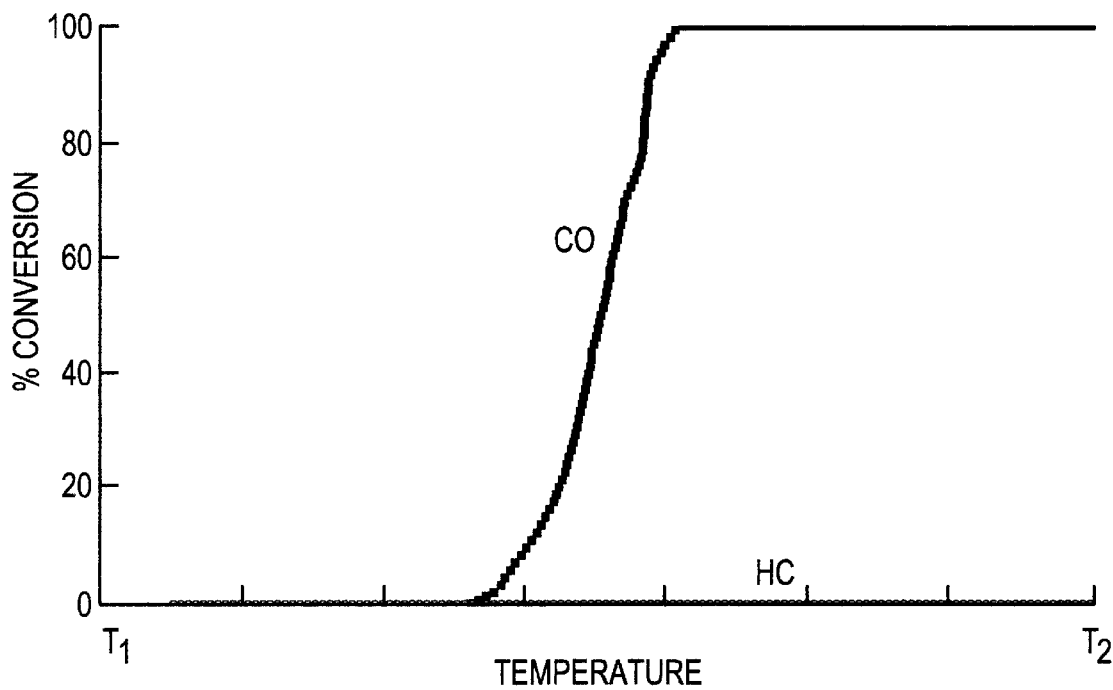
FIG. 1B is a graph similar to that of FIG. 1A but showing ideal conversion curves for a theoretical perfectly selective catalytic material.

In FIGS. 1A through 15, the conversion curve for carbon dioxide is indicated by its chemical symbol "CO", and the conversion curve for hydrocarbon is abbreviated "HC". In FIGS. 1A and 1B, temperature $T_2$ is greater than temperature $T_1$, for example, temperature $T_2$, may be 0° C., and temperature $T_2$ may be 700° or 800° C., with the tick marks on the horizontal axes of FIGS. 1A and 1B each representing increments of 100° C.

Some catalysts are known which exhibit good low-temperature oxidation activity for carbon monoxide so that at low temperatures, generally below 200° C., such catalytic materials can catalyze the oxidation of carbon monoxide selectively in the presence of hydrocarbons, i.e., carbon monoxide will be oxidized preferentially to oxidizing the hydrocarbons. However, such known catalysts are not useful in those applications where higher temperatures, above about 200° C., are required. Further, such low-temperature catalysts tend to be easily poisoned or lose their low-temperature activity for carbon monoxide oxidation after exposure to elevated temperatures above about 200° C.

For applications involving moderate to high temperatures, e.g., for temperatures of the gas stream immediately prior to contacting the catalytic material of from about 200° C. to about 600° C., e.g., from about 250° C. to about 580° C., ideal selectivity for carbon monoxide in preference to hydrocarbon, is illustrated by the theoretical conversion curves of FIG. 1B. As shown by FIG. 1B, the percent conversion of carbon monoxide increases while, over a relatively large temperature range, there is substantially no conversion or oxidation activity for the hydrocarbons.

Figure 5:
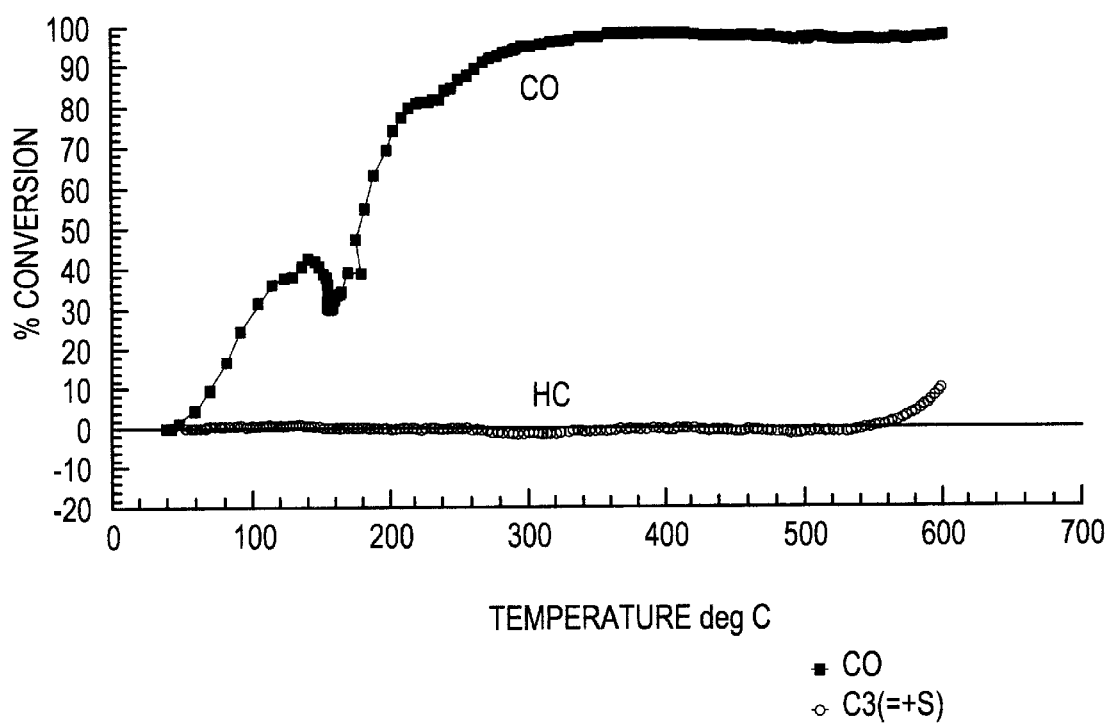
Figure 10A:
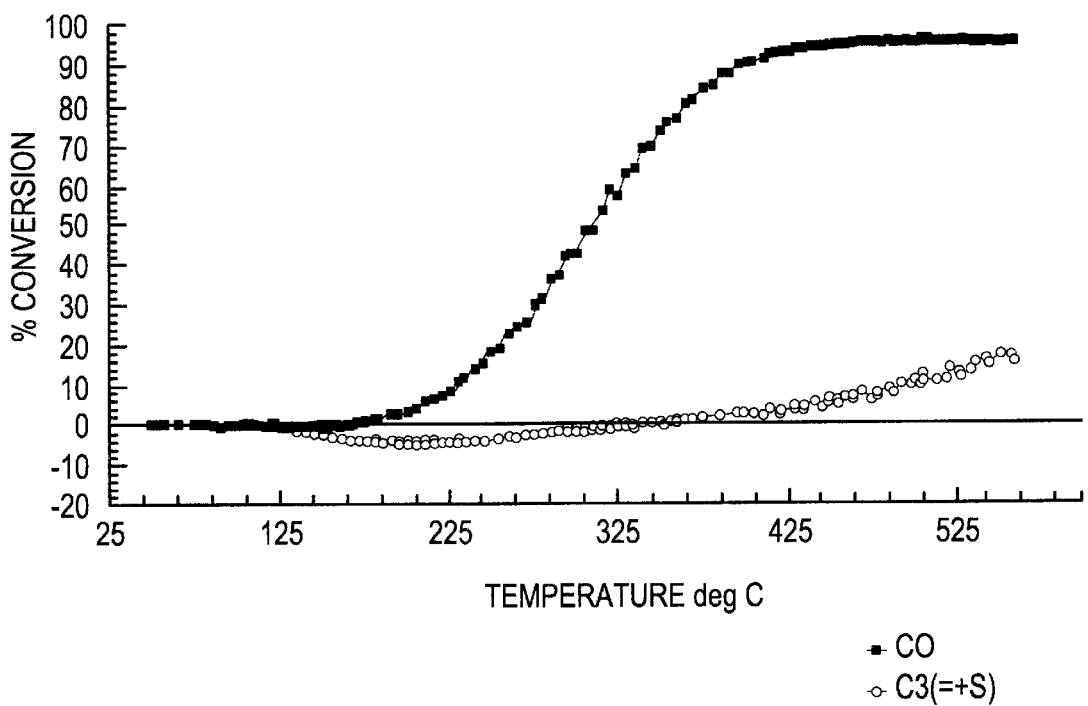
FIGS. 10A and 10B are graphs similar to that of FIG. 1A but showing conversion curves generated by a supported catalytic material in accordance with the present invention before (FIG. 10A) and after (FIG. 10B) steam aging of the catalytic material.
Figure 10B:
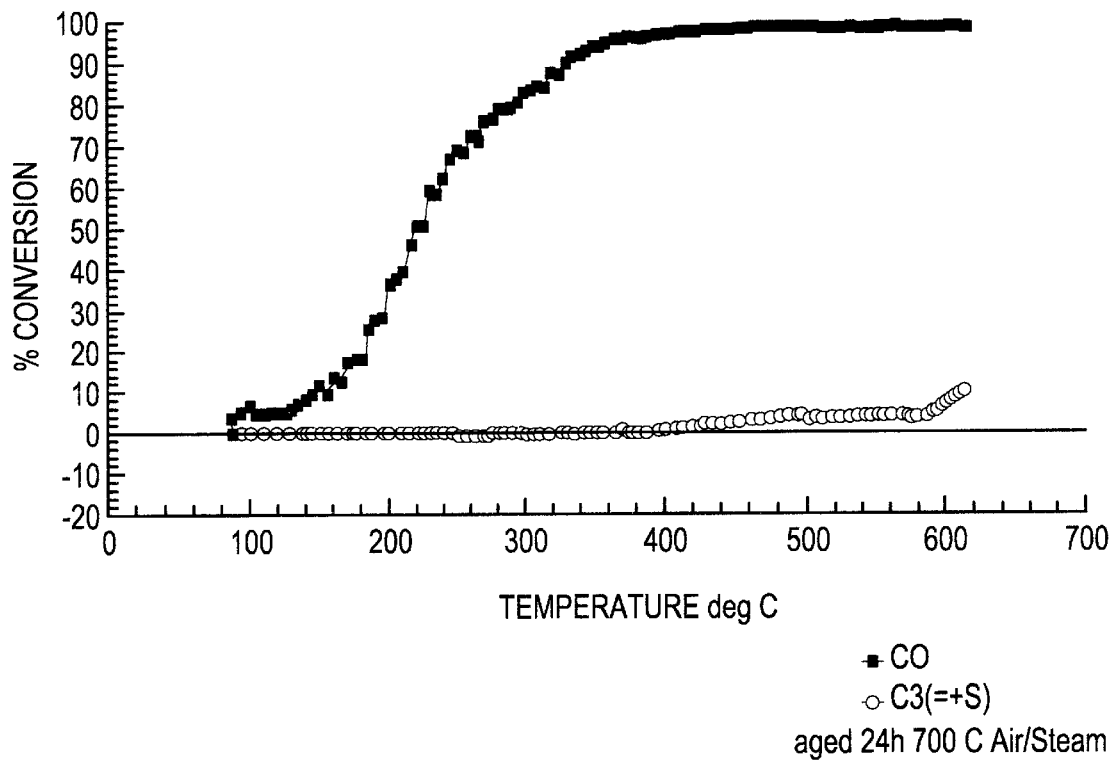

A close approach to the ideally selective conversion curves of FIG. 1B is attained by catalytic materials in accordance with the present invention, for example, see the conversion curves of FIGS. 5 and 10B, discussed in more detail below. As shown, for example, in FIG. 5, there is virtually no hydrocarbon oxidation activity from low temperatures up to approximately 560° C., whereas oxidation of carbon monoxide commences at the very low temperature of about 25° C., increases rapidly at temperatures up to about 140° C., dips slightly, and then rapidly increases again up to a temperature of about 330° C. Further increases in temperature provide nearly 100 percent conversion of carbon monoxide while there is substantially no conversion of hydrocarbons. The high selectivity of catalytic materials in accordance with the present invention for carbon monoxide in the presence of hydrocarbons is well illustrated by FIG. 5 and other Figures, as discussed below. Generally, the gas stream containing carbon monoxide and the hydrocarbon component is at a temperature of from about 200 to 600° C. just prior to contacting the catalytic material. While pre-heating the gas stream was the technique used in generating the data for the examples, in other situations the catalyst itself may be heated in addition to, or in lieu of, pre-heating the gas stream. In still other situations, for example, in treating process gas or engine exhaust streams, the gas stream may already be at an elevated temperature high enough for catalytic oxidation of the carbon monoxide.

As used herein and in the claims, the quantity or "loading" of the catalytic material on beads or other particulate carriers, or on the channel walls of monolithic carriers, is expressed in grams per cubic inch of volume of the finished catalyst. For bead or other particulate carriers this mode of measurement takes into account the catalytically inert volume of the particulates plus the interstices between particles. For monolithic carriers, this mode of measurement takes into account the void spaces provided by the gas flow channels extending through the carrier. The catalytic material may also be used without such carrier, e.g., it may be adhered by a suitable binder material to the surface of a test probe member, as described below in connection with FIG. 18. As is well known in the art, a suitable binder may also be used to increase adherence of the catalytic material to a carrier.

Generally, in order to prepare the supported catalytic material of the present invention, a solution is prepared of suitable rhodium and bismuth salts, for example, nitrates or sulfates. The solution is maintained at a very low pH, generally below a pH of about 1, so that bismuth suboxide does not precipitate from the mixed salt solution. The support particles are then impregnated with the solution containing the bismuth and rhodium salts, and the impregnated support particles are then dried and calcined at a high temperature. As described below, it is preferred that the impregnated support particles be calcined in an oxidant-containing atmosphere such as air (or other oxygen-containing gas) at a temperature above 550° C., for example, at a temperature of at least 600° C., preferably at a temperature of at least 700° C., most preferably at a temperature of 750° C. or higher, for example, 750 to 950° C. Calcination in air is preferred as being the simplest and least expensive calcination technique. Only a relatively brief calcination time has been found to be necessary, especially with calcination temperatures of, e.g., 800 to 900° C. For example, at 850° C., calcination in air for 10 minutes suffices. Variations in the calcination temperature may require variations in the time of calcination.

Any other method which provides for an intimate combination of the rhodium and bismuth component on the support particles may be utilized. This includes, but is not limited to, the inclusion of material such as fluxes and low-melting frits in order to ensure intimate combination. In order to attain the intimate combination of rhodium and bismuth components when utilizing the technique of impregnating the support particles with a solution of the rhodium and bismuth salts, it is preferred that both the rhodium and bismuth be impregnated into the same increment of support. As used herein and in the claims, reference to the same increment of support simply means that individual support particles contain both the rhodium and bismuth components thereon, as opposed to a situation where one batch of support particles is impregnated with the rhodium salt and a separate batch of support particles is impregnated with the bismuth salt and then the two batches of particles are simply mixed.

Any suitable support may be utilized, such as particles of zirconia, stabilized zirconia such as lanthana- or ceria-impregnated zirconia or co-precipitated ceria-zirconia, ceria, stabilized ceria, titania, alumina, stabilized alumina, silica-alumina, silica, and mixtures of two or more thereof. Various spinels and clays (aluminosilicates) may also serve as the support for the catalytic materials. Although activated alumina supports (comprising predominantly gamma-alumina) can be used, it has been found that the use of gamma-alumina as a support particle tends to reduce the selectivity of the catalyst for carbon monoxide as compared to catalysts employing zirconia supports, for example.

The unsupported catalyst version of the catalytic material of the present invention may be prepared without a support by a method which comprises preparing a solution containing both a soluble bismuth salt, such as bismuth nitrate pentahydrate, and a soluble rhodium salt, such as rhodium nitrate. Typically, the solution will be an aqueous solution and after the solution is formed with appropriate concentrations of the rhodium and bismuth salts respectively, the solution may be evaporated to dryness to recover a co-precipitate containing rhodium and the bismuth component. Any other suitable precipitation technique may be employed. The co-precipitate may be oven dried and then calcined at an elevated temperature, usually at least about 550° C., to produce a final product comprising a dark black powder. As discussed in more detail below, the resulting rhodium-bismuth powder appears to contain small amounts of $Bi_2O_3$ and $Rh_2O_3$ plus one or more unidentified rhodium/bismuth crystalline phases plus some amorphous material. In any case, the unsupported catalytic material may be utilized as a powder which is packed within a tube or other suitable vessel through which gas may be flowed, or the unsupported catalyst may be pressed or extruded or otherwise formed into the shape of beads, pellets, extrudates or the like, or it may be coated on a suitable carrier such as alumina beads or the walls of the gas flow passageways a honeycomb-type catalyst carrier. For being pressed or otherwise formed into a particular shape and for being coated onto a carrier, a binder and/or other suitable adjunct materials may be added to the unsupported catalyst powder.

As is the case with the supported catalyst version of the catalytic material of the present invention, one or more platinum group metals may optionally be added to the co-precipitated catalyst version by simply adding a soluble salt of such metal or metals to the solution and co-precipitating the rhodium, bismuth and one or more optional metals, e.g., platinum.

As described below with reference to the examples, and as is well known to those skilled in the art, the supported catalyst version of the catalytic material of the present invention is usually deposited as a coating on a suitable carrier which may comprise small beads or other particles or honeycomb-type monolithic substrates comprised of a suitable ceramic-like material, e.g., cordierite. A binder may optionally be added. Such carrier is usually formed as a cylindrical monolith having a plurality of fine, parallel gas flow passages extending therethrough, the walls of which passages are coated with a slurry containing the catalytic material and thereafter dried and calcined, as is well known to those skilled in the art. With the addition of a suitable binder to promote adherence of the powder-like material to the carrier, the unsupported catalyst version of the catalytic material of the present invention may also be deposited upon a suitable carrier.

The atomic ratio of bismuth to rhodium in the catalytic material (both the supported and unsupported versions) may vary over a wide range, for example, a Bi:Rh atomic ratio of from about 0.1 to 1 to 10.1. However, a preferred ratio is an atomic ratio of bismuth to rhodium of from about 0.5:1 to 4:1, more preferably from about 1:1 to 2.5:1. At atomic ratios of Bi:Rh of less than about 0.1 to 1, even at less than about 0.5:1, the amount of bismuth present may be insufficient to adequately suppress hydrocarbon oxidation in the conditions prevailing in the particular gas being treated. In most cases, an atomic ratio of Bi:Rh of at least 1:1 is desirable. On the other hand, an atomic ratio of Bi:Rh in excess of 4:1 at even moderate absolute loadings of bismuth and rhodium starts to suppress carbon monoxide oxidation, and in most cases increasing the ratio much above 2.5:1 does not provide commensurate suppression of hydrocarbon oxidation.

Similarly, the absolute amounts of bismuth and rhodium in the catalytic material may vary widely. It suffices if a catalytically effective amount of each is present. A catalytically effective amount of a component means that amount which will provide results different or improved from the results which would be obtained if that component were eliminated from the catalytic material. Preferably, the rhodium, calculated as the elemental metal, is present in the amount of from about 0.05 to 30 percent by weight, preferably 0.1 to 20 percent by weight, more preferably 5 to 15 percent by weight, of the weight of the catalytic material on a dry basis and including the rhodium. Other preferred rhodium loading ranges on the same basis as above are from about 0.5 to 15 percent rhodium, preferably from about 1 to 10 percent rhodium. On the same basis as the rhodium loadings, the amount of bismuth component present in the catalytic material, calculated as elemental bismuth, may be at least about 0.01 percent by weight, e.g., at least about 1 percent by weight of the weight of the catalytic material. Typical bismuth loading ranges may be from about 0.01 to 50 percent by weight, preferably from about 1 to 30 percent by weight, of the weight of catalytic material. Any of the foregoing loadings may be used with any appropriate bismuth to rhodium atomic ratio, including the preferred range of 1:1 to 25:1, provided, of course, the total metal loadings do not reach or exceed 100% as described below.

The following Table shows, for the supported version of the catalytic material, typical loadings on the support of bismuth and rhodium at a range of bismuth to rhodium atomic ratios. In the Table, the loadings of bismuth and rhodium are expressed as the percent by weight, calculated as the elemental metals, of the total weight (dry basis) of the catalytic material (bismuth plus rhodium and the support).

TABLE

| Weight %Rh: | 0.05 | 1.0 | 5.0 | 10.0 | 15.0 |
|---|---|---|---|---|---|
| Atomic Ratio Bi:Rh | | | Weight % Bi | | |
| 0.1 | 0.01 | 0.20 | 1.02 | 2.03 | 3.04 |
| 0.5 | 0.05 | 1.02 | 5.08 | 10.15 | 15.23 |
| 1.0 | 0.10 | 2.03 | 10.15 | 20.31 | 30.46 |
| 1.5 | 0.15 | 3.05 | 15.23 | 30.46 | 45.69 |
| 2.5 | 0.25 | 5.08 | 25.38 | 50.77 | 76.15 |
| 4.0 | 0.41 | 8.12 | 40.62 | 81.24 | — |
| 10 | 1.02 | 20.31 | — | — | — |

As the Table shows, at very high loadings of rhodium, the ratios of bismuth to rhodium have to be limited to limit the overall metal loading. Generally, as a practical matter, the total loading of bismuth and rhodium (plus any optional metals) on the support will not exceed about 60 percent by weight of the weight of the catalytic material (including the support), and preferably will not exceed about 50 percent, more preferably will not exceed about 40 percent, of the weight of the catalytic material. As suggested by the Table, if high rhodium loadings are desired, e.g., 15 percent by weight, the bismuth to rhodium atomic ratio will have to be limited to not more than 1.5 if the 60 percent by weight total metals loading is not to be exceeded. (At 15 weight percent rhodium and an atomic ratio of Bi:Rh of 1.5:1, the weight percent of bismuth (45.69%) and rhodium (15%) will total about 60 percent. Obviously, inasmuch as the refractory oxide support comprises part of the supported catalyst version of the catalytic material, the total metal loadings, including the optional non-rhodium platinum group metal (s), must be less than 100 percent by weight of the catalytic material. A range of total metal (bismuth plus rhodium plus any optional metals) loadings at a preferred Bi:Rh atomic ratio range of from about 1:1 to 2.5:1 is from about 4 percent by weight total metals to about 60 percent by weight total metals.

The catalytic material of the present invention may optionally contain one or more platinum group metals in addition to rhodium, particularly platinum. Thus, for the supported catalyst version of the catalytic material, the platinum group metal component (essentially comprising rhodium) may be dispersed onto the support in a conventional manner, e.g., by dissolving platinum group metal salts (essentially including a rhodium salt) and contacting the support particles with the resulting solution. Such salts as rhodium-amine complexes, chlorides and nitrates of rhodium may be employed in preparing the salt solution for impregnation into the support. The wetted particles are then dried and calcined in air to deposit the platinum group metal component on the support particles. As noted above, one or more of soluble bismuth salts such as bismuth nitrate, bismuth sulfate, bismuth chloride, bismuth phosphate, bismuth carbonate, bismuth hydroxide nitrate oxide and organic complexes and salts of bismuth such as bismuth potassium tartrate, bismuth sodium tartrate, bismuth acetate and bismuth oxalate may be used to impregnate the support with the bismuth component. Such salts or complexes may, but need not, be dissolved in the same solution as the rhodium (and, optionally, other platinum group metal) salts, for use in impregnating the support in preparing the supported catalyst version of the catalytic material of the present invention. If separate solutions of soluble rhodium salts or complexes and soluble bismuth salts are employed to sequentially impregnate the support, the order of impregnation is not important.

The same solutions and/or complexes of rhodium and bismuth and any optional other platinum group metals as described above may be utilized in preparing the unsupported version of the catalytic material of the present invention, in which the support is omitted. In that case, it is preferred that the rhodium and bismuth salts and/or complexes (and any salts and/or complexes of the one or more optional platinum group metals) be in the same solution so that co-precipitation may be attained to provide an intimate dispersal of the rhodium and bismuth components with each other in a single preparation step. However, precipitation of the rhodium and bismuth components from separate solutions followed by mixing the resulting precipitates may conceivably be employed. Generally, co-precipitation, as opposed to precipitation from separate solutions and subsequent admixture of the precipitates, is preferred for preparing the unsupported catalysts. Without wishing to be bound by any theory, it is believed that the intimate combination attained by co-precipitation of the rhodium and bismuth components from a solution of salts of both metals enhances selectivity of the catalyst. The efficacy of intimate admixture of the rhodium and bismuth components is also apparent with the supported catalytic materials. As discussed elsewhere herein, dispersing the bismuth and rhodium components on the same increment of support material in the supported version of the catalytic material of the present invention provides better selectivity than would be attained by having a first increment of support particles having the bismuth component dispersed thereon and a second increment of the support particles having the rhodium component dispersed thereon.

In all cases, aqueous solutions of the salts and/or complexes of rhodium, bismuth (and any optional metals) are preferred for low cost and ease of handling.

Reference herein and in the claims to rhodium, and to any one or more of the other, optional platinum group metals, such as platinum, palladium, etc., in the finished catalyst is not to be interpreted as requiring that the rhodium or other platinum group metal components be present as the elemental metal, although that is believed to be the case for the supported version of the catalytic material. The unsupported version of the catalytic material, as discussed below, shows an X-ray diffraction pattern which indicates the presence of at least some of the rhodium in the form of a rhodium oxide. Similarly, reference herein and in the claims to the bismuth component in the finished catalyst should not be construed as excluding elemental bismuth, although the bismuth component is believed to be present in the supported catalyst version as the oxide and in the co-precipitated, unsupported version as both an oxide and in a rhodium/bismuth crystalline phase or phases.

EXAMPLE 1

Preparation of Supported Catalysts In General

This Example gives two general methods for preparation of supported catalysts comprising a catalytic material disposed on a substrate carrier. When preparations of specific catalysts given in the examples below differ from that of this general Example, the differences are noted in the individual examples below. Quantities which are unspecified in this general Example and given as "A", "B", etc., are of course specified in the examples below. Examples 1 through 12 deal with supported versions of catalytic material.

Method A. The General Preparation Technique Using Bismuth Nitrate.

1. Dissolve A grams of bismuth nitrate pentahydrate in B grams of precious metal nitrate solution.
2. Weigh C grams of particulate support (powder) into a beaker.
3. Slowly add the precious metal/bismuth solution of step 1 to the support of step 2 with stirring. Add the solution until incipient wetness of the support powder is achieved.
4. Dry the solution-impregnated material obtained in step 3 at 120° C.
5. Repeat steps 3 and 4 until all the precious metal/bismuth solution has been used.
6. Slurry the impregnated material obtained from step 5 to approximately 50% solids in water.
7. Add D grams of zirconium hydroxide paste to the slurry obtained from step 6. (Step 7 provides a binder in the catalytic material to enhance adherence of the catalytic material to the walls of the monolithic carrier to which the catalytic material was applied in the preparation of the test samples.)
8. Place the slurry from step 7 into a jar with grinding media and mill. In cases where the median size (diameter) of the particles of support powder is greater than 5 microns, the milling is continued at least until the median particle size of the support particles is approximately 5 microns with at least 90 percent of the particles being less than about 10 microns in size. (Step 8 reduces the size of the particles sufficiently to avoid large particles obstructing the fine gas flow passageways of the monolithic carrier to which the catalytic material is to be applied.) Still smaller particle sizes may be attained. For example, the ceria-zirconia particles used in some of the following examples are provided at a median particle size of 1 micron in diameter with at least 90 percent of the particles being less than 7.7 microns in diameter. These are milled for forty-five minutes at which time they have a median particle size of 1 micron with at least 90 percent of the particles being less than 3.9 microns in diameter.
9. Using a rotary evaporator, remove water from the slurry obtained from step 8.
10. Oven dry the dried slurry obtained from step 9 to dry solids at 120° C. to provide a dried catalytic material powder.

Method B. The General Preparation Technique Using a Melting Frit.

Frit: The composition of the frit is 81.41% $Bi_2O_3$, 2.91% $Al_2O_3$, 8.76% $B_2O_3$ and 6.92% $SiO_2$, and the frit is in the form of fine particles having a median particle size of approximately 5 microns with at least 50 percent of the particles being less than 2 microns in size.

1. Impregnate A grams of a ceria-zirconia ($CeO_2/ZrO_2$) particulate support with B grams of the desired precious metal solution. The particulate support particles have a median size of 1 micron with at least 90 percent of the particles being less than 3.9 microns in size. The impregnated solids are dried in an oven at 120° C.
2. Add C grams of zirconium hydroxide paste to the impregnated support powder obtained from step 1.
3. Slurry the combined material of step 2 to 40–50% solids with water and ball mill for 45 minutes to provide a comminuted slurry.
4. Using a rotary evaporator, remove water from slurry.
5. Oven dry the material obtained from step 4 at 120° C. to dry solids to obtain a dry catalytic material powder.
6. Slurry 4 grams (dry weight) of the catalytic material obtained from step 5 and D grams of the frit to 45% by weight solids with water to provide a catalytic material slurry.

Applying the Catalytic Material as a Coating on a Honeycomb-Like Monolith Carrier Combine 4 grams (dry basis) of the catalytic material powder obtained from step 10 of Method A with enough water to make a 45% by weight solids slurry, or use the slurry obtained from step 6 of Method B. The resulting slurry is homogenized with a magnetic stirrer and then is transferred to a one-ounce (liquid) capacity plastic vial fitted with a snap cap. A weighed ceramic (cordierite) honeycomb-type monolith carrier in the shape of a cylinder with dimensions 1 inch (2.54 cm) high×⅝ inch (1.59 cm) in diameter and a cell density of 400 cells per square inch (62 cells per square centimeter) is placed into the plastic vial. (The "cell density" refers to the number of parallel gas-flow channels per square inch of end face of the carrier.) The vial is inverted several times to ensure that the slurry passes through all the channels of the monolith to coat the walls thereof. The monolith is then removed from the vial and excess slurry is removed with an air knife. The monolith is weighed to determine if the appropriate amount of coating has been applied. After the coating weight is acceptable, the monolith is dried at 120° C. Then the monolith is placed in a crucible and the crucible is placed into a furnace. The temperature of the furnace is raised to 550° C. for some catalysts and to 850° C. for other catalysts and held at that temperature for 10 minutes. The crucible is then removed from the furnace and allowed to cool to room temperature. The cooled monolith is weighed and the weight of dry coating of catalytic material is determined by subtracting the weight of the uncoated monolith from the weight of the coated monolith. The weight (dry basis) of the coating of the catalytic material on the monoliths is 0.6 gram (which is equivalent to 2.0 grams per cubic inch of the volume of the coated monoliths).

Catalyst Performance Testing

Catalyst performance was evaluated using a laboratory test reactor and procedure. This involves generating a gas stream containing the reactants of interest (carbon monoxide and hydrocarbons comprising a mixture of propane and propene) at the desired concentration, heating the gas stream to the desired temperature, passing the gas stream over the catalyst contained in a quartz tube at the desired temperature and determining the change in concentrations of hydrocarbon and carbon monoxide upstream of and downstream of the catalyst.

Approximately 0.6 gram of catalytic material was coated, as described above, onto a cordierite monolith in the form of a cylinder approximately 1 inch long and ¾ inch in diameter. The cylindrical side of the monolith is wrapped with a belt of ceramic "felt" to prevent gas by-pass around the side of the monolith, i.e., to insure that all the gas flows through the gas-flow channels of the monolith to contact the catalytic material coated on the walls thereof. The wrapped monolith is then inserted into a quartz tube. The quartz tube is placed in a programmable tube furnace whose temperature is controlled by a thermocouple in a quartz thermowell suspended just above the catalyst being tested.

Gases are fed to the reactor tube using mass flow controllers. A static mixer is used to insure good mixing of the feed gases and a syringe pump is used to feed water to a vaporizer to allow inclusion of steam in the feed stream, if desired. The combined feed gases are passed over the catalyst at 5–6 psig.

At the exit to the reactor, any water vapor is removed from the exit gas stream by passing the exit gas stream through a mini gas sampling system (MG-1220-S1-10) apparatus sold under the trademark PERMA PURE by Perma Pure Inc. of Toms River, N.J. This apparatus comprises a water-permeable membrane through which the water content only of the tested gas stream passes for removal by a nitrogen carrier gas. The dried exit gas stream is then directed to three different Rosemont analyzers: one to analyze for total hydrocarbon content, one for carbon monoxide content and one to analyze for carbon dioxide content.

In a typical experiment, a "conversion curve" (often referred to as a "light-off" curve) of feed species versus temperature is generated. The conversion is obtained by raising the temperature of the reactor in a controlled linear fashion from ambient or near ambient to 500 to 700° C. and noting the change, if any, of reactant concentration in the product gas as a function of temperature. Typically, one analytical result is recorded every 20 seconds. The conversions (oxidation) of carbon monoxide and hydrocarbon were calculated by measuring the differences in, respectively, the carbon monoxide and hydrocarbon contents of the feed (to the catalyst) and exit (from the catalyst) test gas streams. These conversions were plotted versus temperature of the inlet gas stream to the catalyst to generate a conversion curve. Percent conversion for any reactant species is defined as the difference between the concentration of the species in the feed gas to the catalyst and the concentration of the species in the exit gas from the catalyst, divided by the concentration of the species in the feed gas, all multiplied by 100.

Typical Reactor Conditions

1. Flow Rates

Total Dry Flow (excluding water vapor) is 3000 cc/min at standard temperature and pressure ("STP"), i.e., 70° F. and 1 atmosphere, and includes an Air Flow of 40–75 cc/min at STP.

Total Wet Flow (including water vapor): 3408 cc/min at STP.

Space Velocity: 25,000 per hour at STP.

2. Temperature

Temperature Ramp Rate: 15° C./minute

3. Composition of Test Gas

Carbon Monoxide Concentration: 1400–1700 ppm by volume

Total Hydrocarbon (propene plus propane) Concentration: 900–1000 ppm by volume, C1 basis.

Molar Ratio of Propane: Propene is 52:48

Nitrogen: balance

Nomenclature

Once the catalytic material is coated onto the walls of the gas flow channels of the monolith carrier and the coating is dried, the resulting product is referred to as a "catalyst". All percents (or %) of a component referred to in the following examples are percent by weight (dry basis) of the component based on the total weight of the catalytic material, including the component, unless specifically otherwise stated.

SPECIFIC EXAMPLES

EXAMPLE 2

Conventional (Comparative) Platinum on Alumina Catalyst

Figure 2:
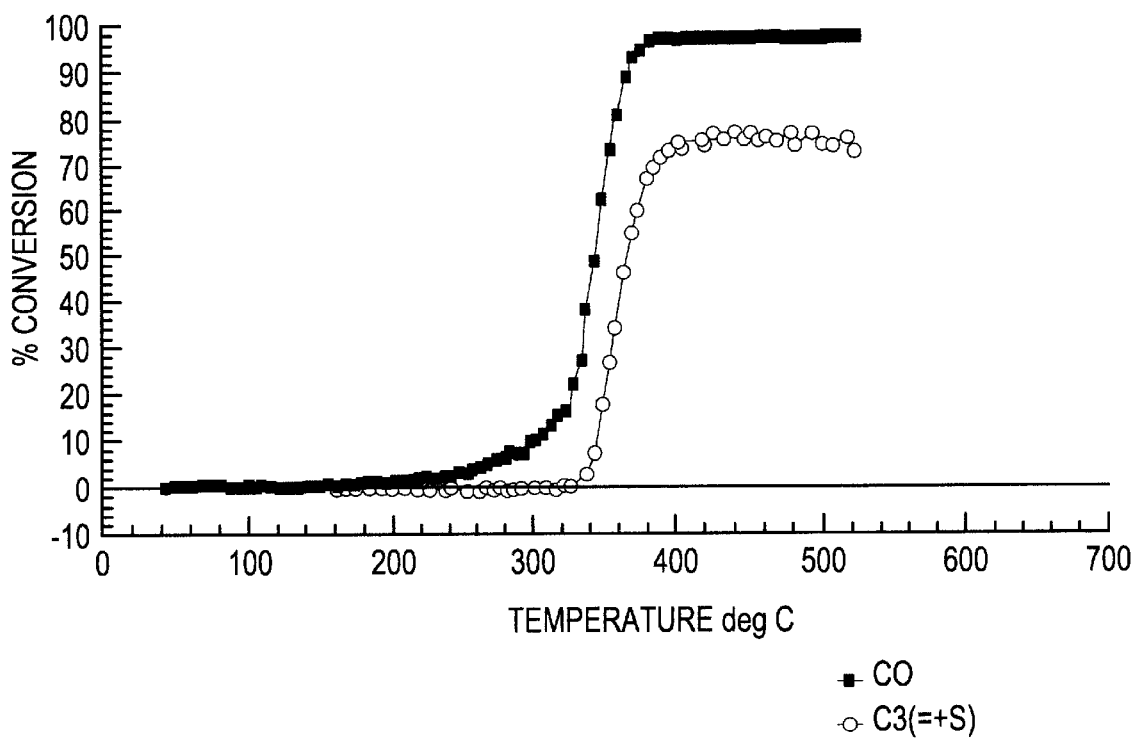
FIG. 2 is a graph similar to that of FIG. 1A but showing conversion curves generated by a first comparative catalytic material not in accordance with the present invention.

A conventional platinum-on-alumina catalytic material was prepared by impregnating gamma-alumina powder with an aqueous solution of a soluble platinum salt using a technique similar to Method A of Example 1. The impregnated alumina was calcined at 550° C. for 2 hours. The platinum content of the catalytic material was 0.2 wt %. The catalytic material was coated onto a monolith and tested as described in Example 1. The total catalytic material coating on a dry basis was 2 grams per cubic inch. The resulting conversion curve is shown in FIG. 2, from which it is seen that carbon monoxide and hydrocarbons are oxidized, i.e., converted, at similar temperatures, and so the selectivity of the catalyst for carbon monoxide is low.

EXAMPLE 3

Rhodium on Ceria-Zirconia Support

A catalyst containing 2.6% Rh on a ceria-stabilized zirconia support was prepared according to Method B, using the following ingredients.

A=40 grams $CeO_2/ZrO_2$

B=10.8 grams aqueous rhodium nitrate solution (10.08% Rh)

C=4.3 grams zirconium hydroxide paste (27% solids)

D=0 gram

Item A, the ceria-stabilized zirconia support was prepared by the method disclosed in U.S. Pat. No. 5,057,483 issued Oct. 15, 1991 to C. Z. Wan and entitled "Catalyst Composition Containing Segregated Platinum and Rhodium Components". Starting at column 8, line 58, the Wan Patent refers to an article by Luccini, E., Mariani, S., and Sbaizero, O. (1989) "Preparation of Zirconia Cerium Carbonate in Water With Urea", *Int. J of Materials and Product Technology*, vol. 4, no. 2, pp. 167–175, as disclosing a suitable technique for preparing a co-precipitated ceria-zirconia support. As disclosed starting at page 169 of the article, a dilute (0.1M) distilled water solution of zirconyl chloride and cerium nitrate in proportions to promote a final product of $ZrO_2$ containing 10 mol % $CeO_2$ is prepared with ammonium nitrate as a buffer, to control pH. The solution was boiled with constant stirring for two hours and complete precipitation was attained with the pH not exceeding 6.5 at any stage. The resultant precipitated particles contained ceria dispersed substantially throughout the matrix of the precipitated zirconia particles.

Figure 3:
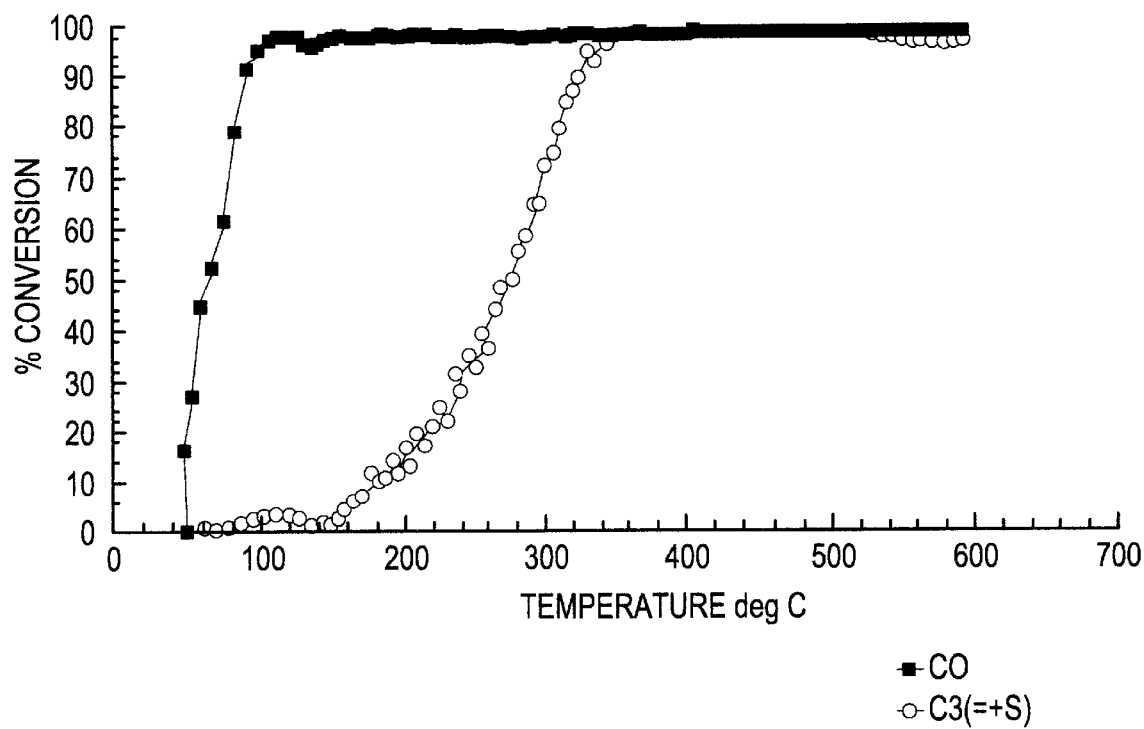
FIG. 3 is a graph similar to that of FIG. 1A but showing conversion curves for a second comparative catalytic material not in accordance with the present invention.

The resulting catalyst was coated onto a monolith and tested as in Example 1. The total catalytic material coating on a dry basis was 2 grams per cubic inch. The resulting conversion curve is shown in FIG. 3. Carbon monoxide and hydrocarbon oxidation are well separated. However, significant hydrocarbon oxidation occurs at a relatively low temperature so that this catalyst has acceptable carbon monoxide selectivity only at temperatures of less than about 250° C.

EXAMPLE 4

Rhodium Bismuth on Ceria zirconia

A catalyst containing rhodium and bismuth on ceria-stabilized zirconia was prepared according to Method A, using the following ingredients.

A=36.6 grams of bismuth nitrate pentahydrate
B=58.0 grams of rhodium nitrate solution (10.37% Rh)
C=40.0 grams of ceria-stabilized zirconia
D=2.4 grams of zirconium hydroxide paste (50% solids)

Figure 4:
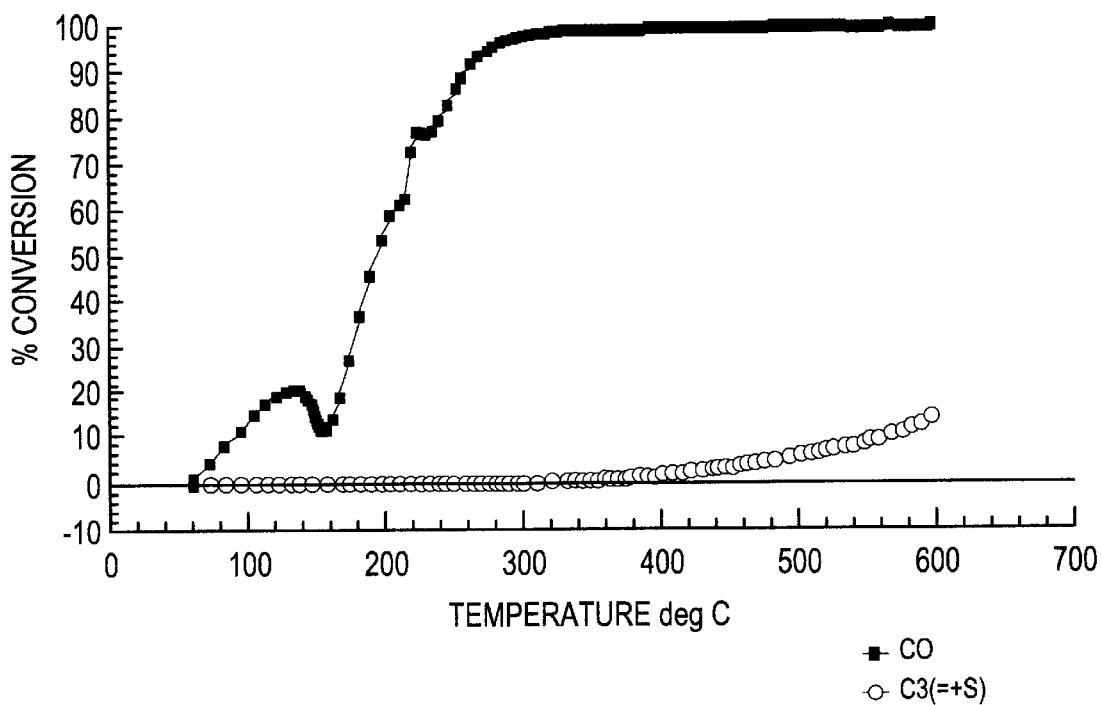
FIGS. 4 and 5 are graphs similar to that of FIG. 1A but showing conversion curves generated by two different supported catalytic materials in accordance with embodiments of the present invention.

The resulting catalyst was coated onto a monolith and tested as in Example 1. The resulting conversion curve is shown in FIG. 4. This curve closely approximates the ideal selectivity pattern illustrated by FIG. 1B. This catalyst is very selective for carbon monoxide oxidation in the presence of hydrocarbons over a wide temperature range of up to about 500° C. and shows good selectivity up to about 600° C.

EXAMPLE 5

Rhodium Bismuth on Ceria Zirconia

A catalyst containing rhodium and bismuth on ceria-stabilized zirconia was prepared according to the procedures in Method A using the following ingredients.

A=6.7 grams of bismuth nitrate pentahydrate
B=10.8 grams of rhodium nitrate solution (10.08% Rh)
C=20.0 grams of ceria-stabilized zirconia
D=2.2 grams of zirconium hydroxide paste (27% solids)

The catalyst was coated onto a monolith as in Example 1. The total catalytic material coating on a dry basis was 2 grams per cubic inch. The catalyst was then steamed at 700° C. for 24 hours in an atmosphere of 12% steam, balance air. This catalyst was then tested for catalytic performance as in Example 1. The resulting conversion curve is shown in FIG. 5. This curve closely approximates the ideal selectivity pattern illustrated by FIG. 1B. This catalyst is very selective for carbon monoxide oxidation in the presence of hydrocarbons at temperatures up to 600° C. This example shows that high temperature hydrothermal aging did not deteriorate the performance of the catalyst.

EXAMPLE 6

Lower Temperature Calcination

Figure 6:
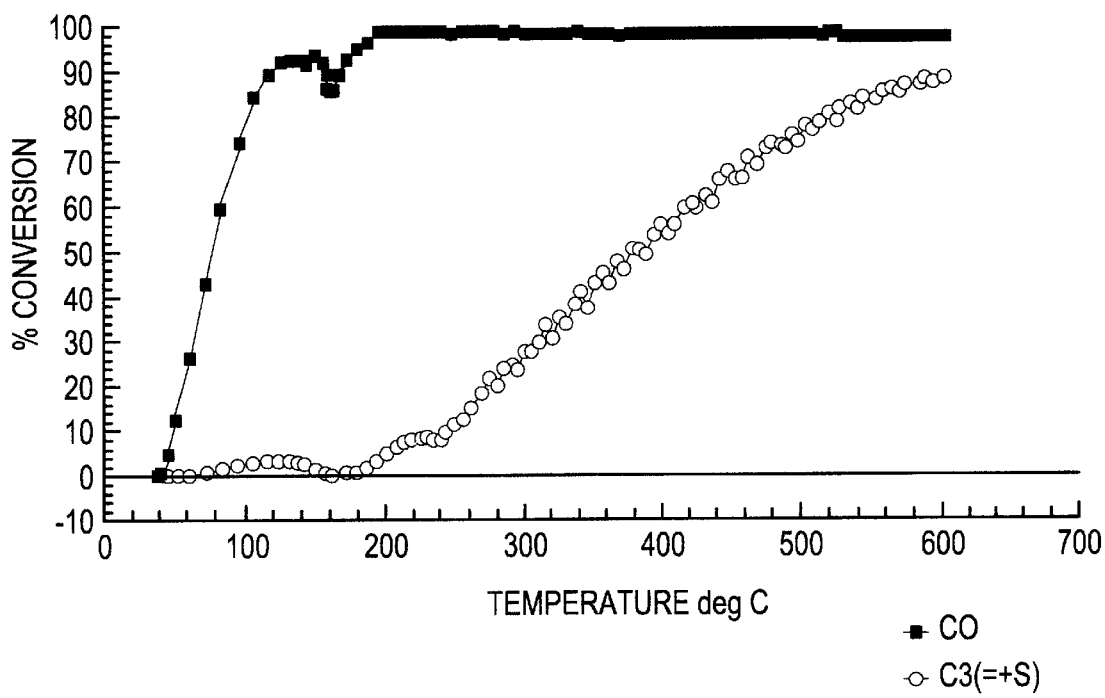
FIG. 6 is a graph similar to that of FIG. 1A but showing conversion curves generated by a supported catalytic composition in accordance with an embodiment of the present invention which was prepared by a non-preferred method.

The catalyst compositions of this invention are best prepared by high temperature calcination, i.e., calcination at temperatures at or above 600° C., preferably at 700° C. or higher, e.g., at a temperature of 850° C. To demonstrate this, a catalyst was prepared as in Example 5, but without steaming, and was calcined at 550° C. instead of 850° C. during preparation in accordance with Method A of Example 1. The resulting catalyst was coated onto a monolith and tested for catalytic performance as in Example 1. The total catalytic material coating on a dry basis was 2 grams per cubic inch. The resulting conversion curve is shown in FIG. 6. The selectivity of this catalyst for carbon monoxide oxidation is significantly worse than those catalysts in Examples 3 and 4 that were prepared by exposure to high temperatures.

EXAMPLE 7

Rhodium Bismuth on Zirconia

A catalyst was prepared generally according to Method A, using the following ingredients.

Figure 7:
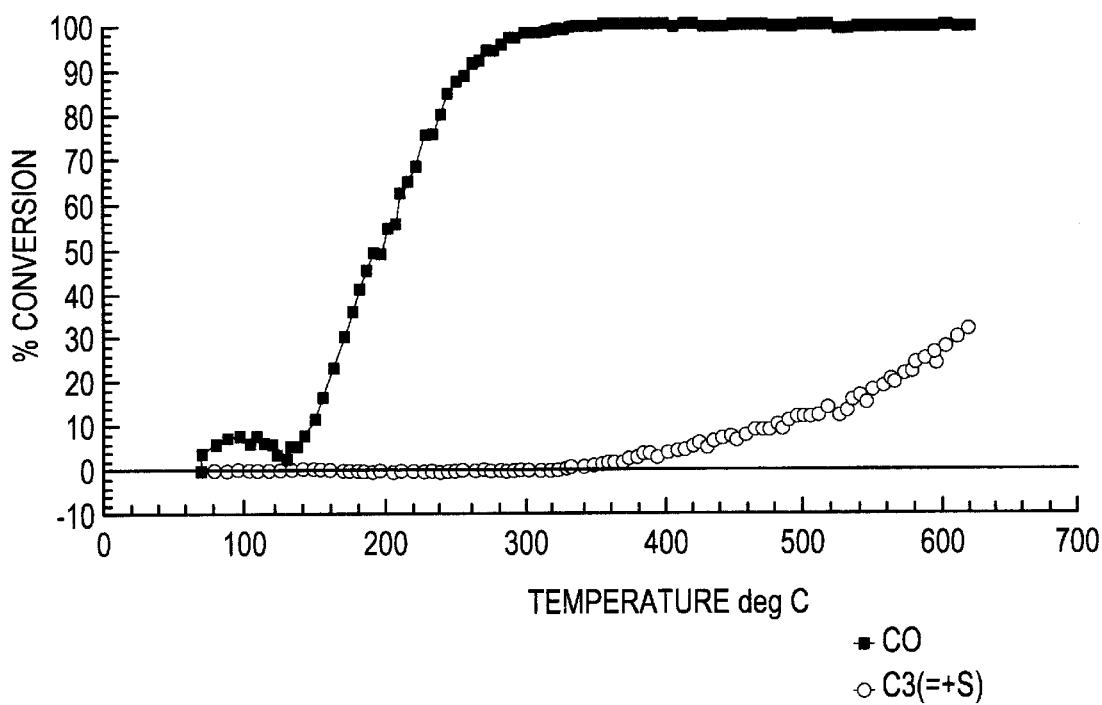
FIG. 7 is a graph similar to that of FIG. 1A but showing conversion curves generated by a supported catalytic material in accordance with another embodiment of the present invention.

A=7.6 grams of bismuth nitrate pentahydrate
B=12.77 grams of aqueous rhodium nitrate solution (9.75% Rh)
C=20.0 grams of zirconium oxide made by drying zirconium hydroxide in an oven at 110° C. and then calcining it for 1 hour at 450° C.
D=none The bismuth nitrate pentahydrate was dissolved in the rhodium nitrate solution with the pH maintained at less than or equal to 1. The resulting rhodium/bismuth solution was impregnated into the calcined zirconium oxide to incipient wetness. The impregnated solid was dried at 115° C. These steps were repeated until all the rhodium/bismuth solution was used. The dried, impregnated material was slurried in water (50% solids), combined with grinding media and milled for 1.5 hours. The resulting slurry was transferred to a flask and the water removed using a rotary evaporator. The remaining solids were dried at 115° C. The resulting catalyst was coated onto a monolith and tested for catalytic performance as in Example 1. The total catalytic material coating on a dry basis was 2 grams per cubic inch. The resulting conversion curve is shown in FIG. 7. The selectivity of this catalyst for carbon monoxide oxidation is similar to that of FIG. 6, which concerned the rhodium/bismuth catalyst disposed on a on ceria-zirconia-support. Therefore, it is seen that the inclusion of ceria in the support is not essential for good selectivity.

EXAMPLE 8

Rhodium Bismuth on Alumina

A catalyst was prepared according to Method A, using the following ingredients.

Figure 8:
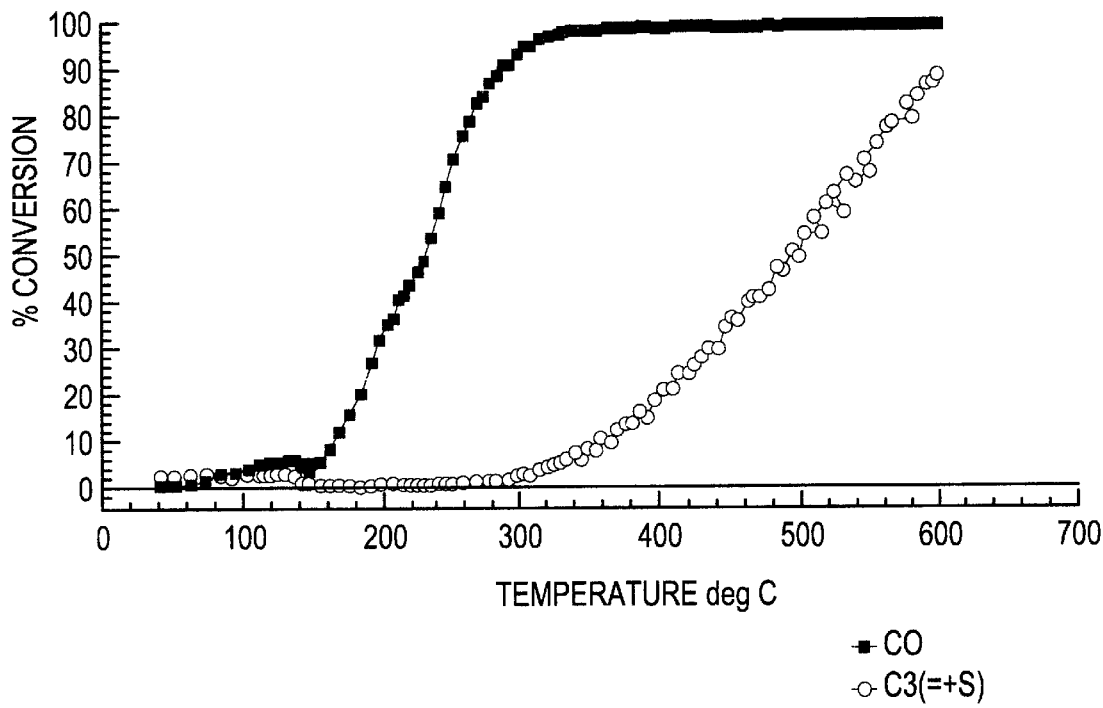
FIG. 8 is a graph similar to that of FIG. 1A but showing conversion curves generated by a supported catalytic material in accordance with an embodiment of the present invention but which utilizes a non-preferred refractory inorganic oxide support.

A=6.7 grams bismuth nitrate pentahydrate
B=11.1 grams rhodium. nitrate solution (9.75% Rh)
C=20.0 grams gamma-alumina
D=none The resulting catalyst was coated onto a monolith and tested for catalytic performance as in Example 1. The total catalytic material coating on a dry basis was 2 grams per cubic inch. The resulting conversion curve is shown in FIG. 8. The selectivity of this catalyst for carbon monoxide oxidation is significantly poorer than the rhodium and bismuth on ceria-zirconia or zirconia support. Therefore, it is seen that an alumina support adversely affects selectivity of the catalyst.

EXAMPLE 9

Rhodium Plus Bismuth Oxide on Ceria Zirconia

A catalyst consisting of 2.6% Rh on a ceria-stabilized zirconia support was prepared according to Method B, using the following ingredients.

A=40 grams of $CeO_2/ZrO_2$

B=10.8 grams of aqueous rhodium nitrate solution (10.08% Rh)

C=4.3 grams of zirconium hydroxide paste (27% solids)

D=0 gram

Figure 9:
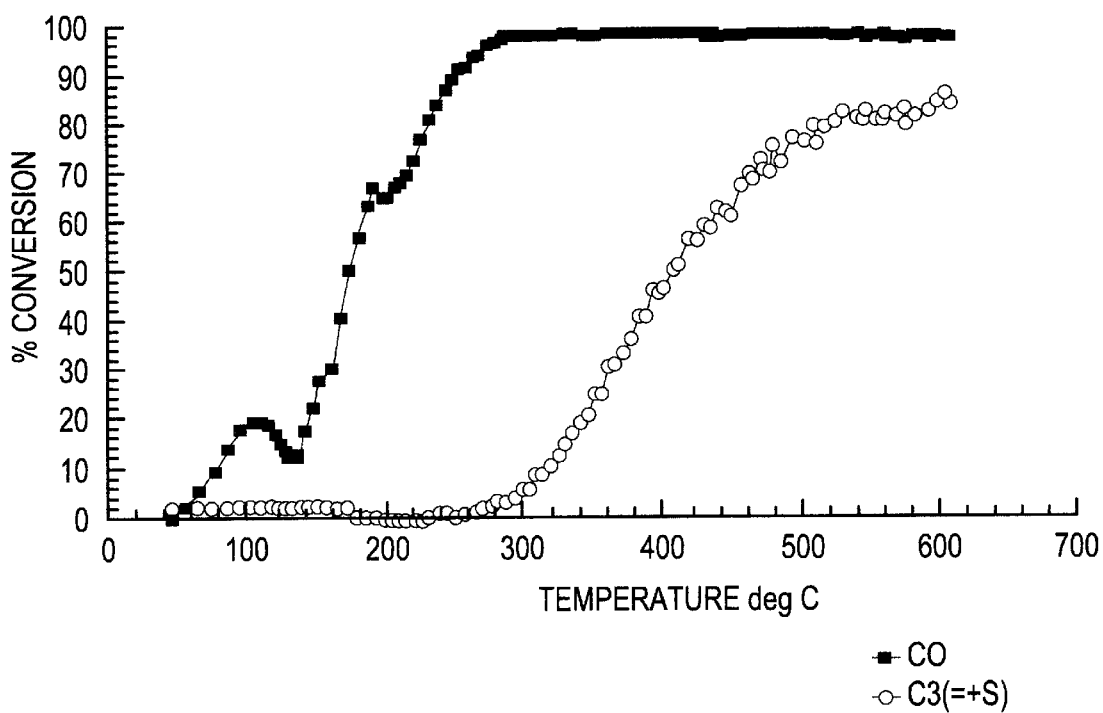
FIG. 9 is a graph similar to that of FIG. 1A but showing conversion curves generated by a supported catalytic material in accordance with an embodiment in which the rhodium and the bismuth component are not intimately admixed as required by a preferred embodiment of the present invention.

Four grams of the catalytic material was slurried with 0.76 gram of bismuth oxide prior to coating the catalytic material onto the monolith. The resulting catalytic material therefore comprised particles of ceria-stabilized zirconia, on which rhodium was dispersed, and particles of bismuth oxide. The rhodium-impregnated particles and the bismuth oxide particles are intimately admixed one with the other in the catalytic material. The resulting slurry was coated onto a monolith and tested as in Example 1. The total catalytic material coating on a dry basis was 2 grams per cubic inch. The resulting conversion curve is shown in FIG. 9. The selectivity for carbon monoxide oxidation is seen to be significantly worse than that of the catalysts of Examples 3 and 4 (FIGS. 3 and 4). This indicates that the rhodium and bismuth are preferably intimately contacted to obtain good selectivity, i.e., they should preferably be dispensed on the same increments of support.

EXAMPLE 10

Rhodium Bismuth Catalyst from Frit

A catalyst containing Rh on a ceria-stabilized zirconia support was prepared according to Method B, using the following ingredients.

A=40 grams of $CeO_2/ZrO_2$

B=10.8 grams of aqueous rhodium nitrate solution (10.08% Rh)

C=4.3 grams of zirconium hydroxide paste (27% solids)

D=0.44 gram of the frit of Method B of Example 1.

The resulting catalyst was coated onto a monolith and tested as in Example 1. The total catalytic material coating on a dry basis was 2 grams per cubic inch. The resulting conversion curve is shown in FIG. 10A. The carbon monoxide selectivity is similar to Examples 3 and 4 (FIGS. 3 and 4). The coated monolith was then, after testing, steamed at 700° C. for 24 hours (12% steam, balance air). The resultant aged catalyst was tested again as in Example 1. The resulting conversion curve is shown in FIG. 10B. Comparison of FIGS. 10A and 10B indicates that the activity for carbon monoxide oxidation and selectivity for carbon monoxide oxidation in the presence of hydrocarbons both improved with steam aging of the catalyst.

EXAMPLE 11

Platinum Bismuth on Ceria-Zirconia Comparative Catalyst

A catalyst containing Pt on a ceria-stabilized zirconia support was prepared according to Method B, using the following amounts:

A=40 grams of $CeO_2/ZrO_2$

B=7.7 grams of aqueous platinum amine hydroxide solution (15.54% Pt)

C=4.3 grams of zirconium hydroxide paste (27% solids)

D=0.44 gram of the frit of Method B of Example 1.

Figure 11:
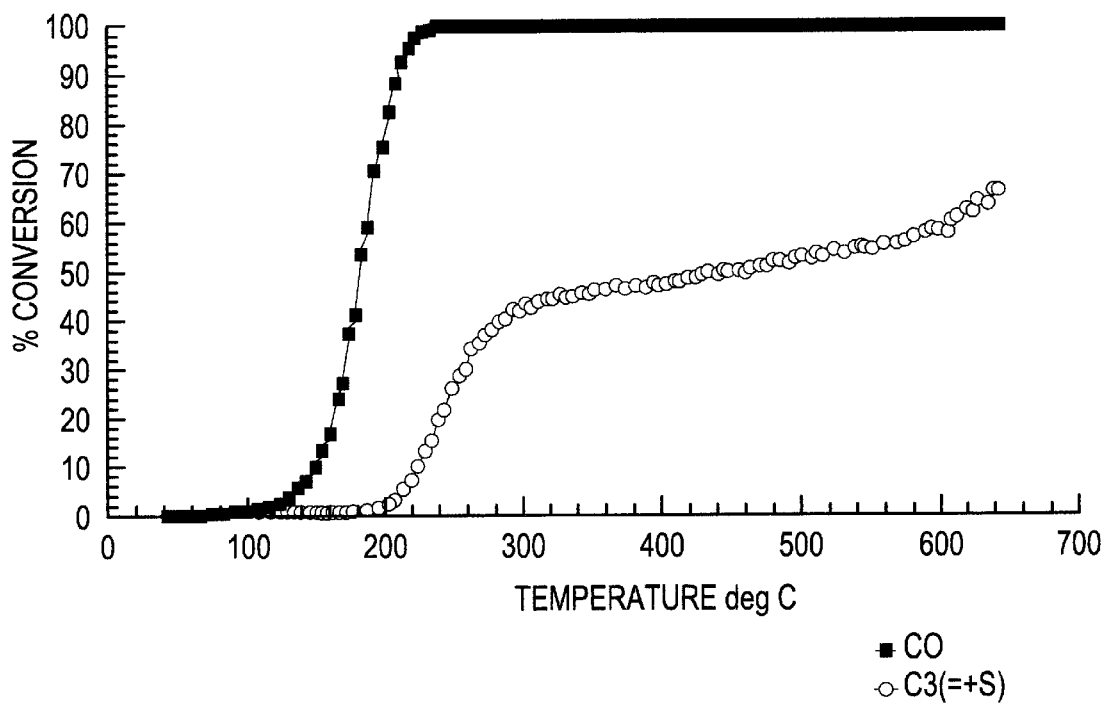
FIGS. 11 and 12 are graphs similar to that of FIG. 1A but showing conversion curves generated by, respectively, two different comparative catalysts in which other platinum group metals have been substituted for the rhodium.

1.2 ml of acetic acid was mixed into the impregnated solids. The resulting catalyst was coated onto a monolith and tested as in Example 1. The total catalytic material coating on a dry basis was 2 grams per cubic inch. The resulting conversion curve is shown in FIG. 11. Hydrocarbon oxidation is seen to be suppressed somewhat. However, the carbon monoxide selectivity is poorer than the rhodium analog.

EXAMPLE 12

Palladium Bismuth on Ceria Zirconia Comparative Catalyst

A catalyst containing Pd on a ceria-stabilized zirconia support was prepared according to Method B, using the following amounts:

A=20 grams $CeO_2/ZrO_2$

B=2.5 grams palladium nitrate solution (20.84% Pd)

C=2.2 grams zirconium hydroxide paste (27% solids)

D=0.44 gram of the frit of Method B of Example 1.

Figure 12:
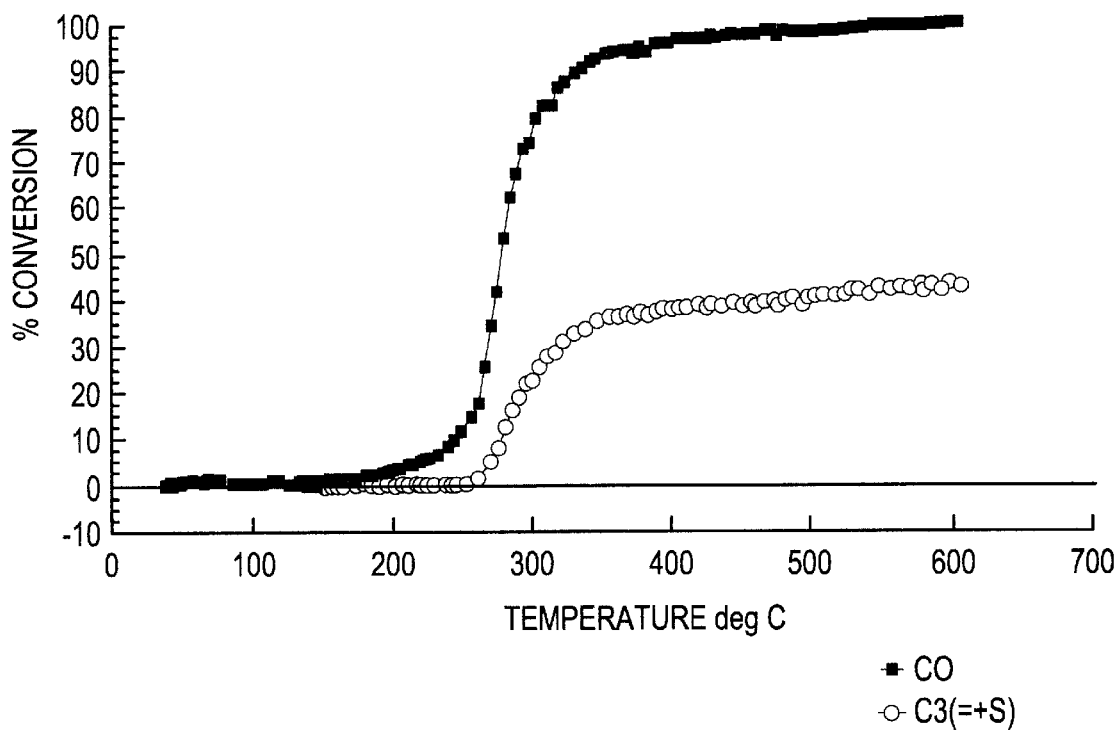

The resulting catalyst was coated onto a monolith and tested as in Example 1. The total catalytic material coating on a dry basis was 2 grams per cubic inch. The resulting conversion curve is shown in FIG. 12. Hydrocarbon oxidation is seen to be suppressed somewhat. However, the carbon monoxide selectivity is poorer than for the rhodium analog.

Example 13 concerns the preparation of co-precipitated versions of the catalytic material of the present invention.

EXAMPLE 13

Preparation of Unsupported Catalysts in General

A. This example gives a general method for preparation of unsupported catalysts produced in the form of a powder using a co-precipitation technique. Quantities which are unspecified in this general part A are given as "X" and "Y" and are specified in parts B through E hereof.

X grams of bismuth nitrate pentahydrate is dissolved in Y grams of rhodium nitrate solution. The mixed nitrate solution is placed into a small round bottom flask and the water is removed using a rotary evaporator. The remaining material is placed into an evaporating dish and oven dried at 120° C. for about 16 hours. The dried solid is placed into a crucible and calcined in air at 500° C. for 10 minutes and then 850° C. for ten minutes. The final product is a dark black powder.

B. Catalyst B. Bi:Rh atomic ratio=0.35
  X=1.9 g bismuth nitrate pentahydrate
  Y=11.1 g rhodium nitrate solution (10.37% Rh)

C. Catalyst C. Bi:Rh atomic ratio=0.5
  X=2.7 g bismuth nitrate pentahydrate
  Y=11.1 g rhodium nitrate solution (10.37% Rh)

D. Catalyst D. Bi:Rh atomic ratio=0.7
  X=3.8 g bismuth nitrate pentahydrate
  Y=11.1 g rhodium nitrate solution (10.37% Rh)

E. Catalyst E. Bi:Rh atomic ratio=1.3
  X=6.7 g bismuth nitrate pentahydrate
  Y=11.1 g rhodium nitrate solution (9.75% Rh)

Catalyst Performance Testing

The powders comprising unsupported Catalysts B through D were tested as powders by placing about 0.1 to 0.2 g of the powder in an approximately 14 mm inside diameter quartz tubular reactor containing a quartz frit in the middle region of the tube. The rest of the test apparatus and reactor flows were as described above under the heading "Catalyst Performance Testing" in Example 1.

Before testing, Catalysts C and D were reduced by flowing 1500 to 3000 ppm carbon monoxide in nitrogen across the catalyst material as the temperature was slowly raised from room temperature to 400° C. over a period of 30 to 40 minutes. The powder was cooled down in a flow of nitrogen prior to catalytic performance testing. Catalyst B was not so reduced.

The results of performance testing of these catalysts were obtained as described above in connection with Example 1. Resulting light-off curves for Catalysts B, C and D, having atomic ratios of Bi:Rh of 0.35, 0.5 and 0.7, respectively, are shown in FIGS. 13, 14 and 15.

Figure 13:
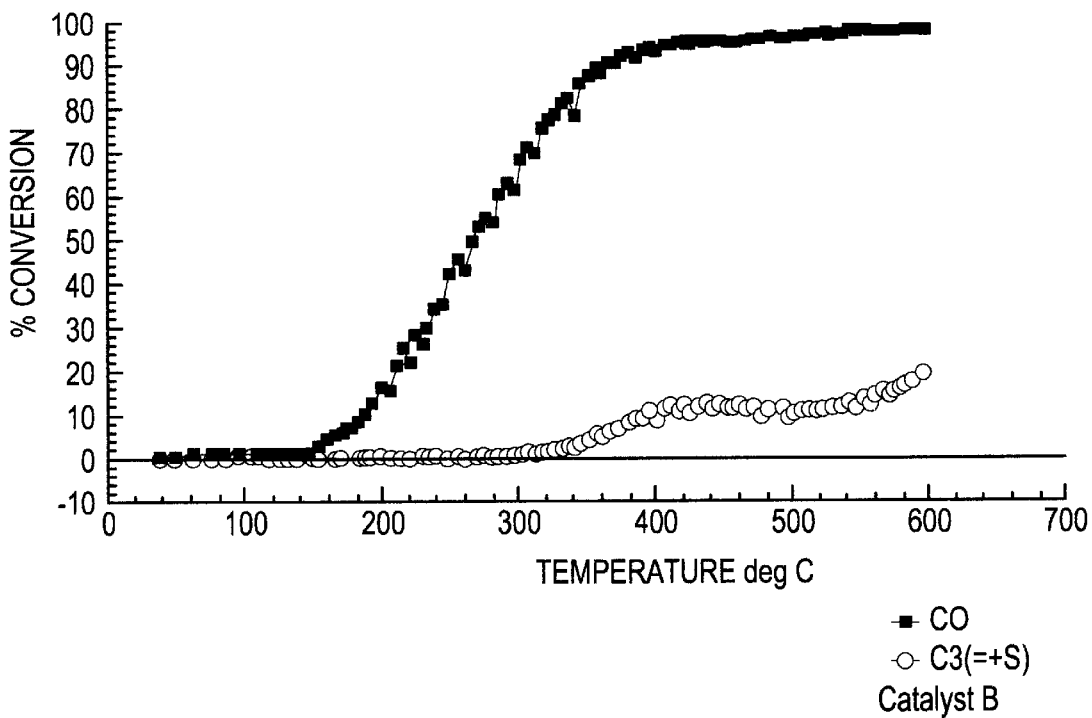
FIGS. 13, 14 and 15 are graphs similar to that of FIG. 1A but showing conversion curves generated by, respectively, three different co-precipitated catalysts (Catalysts B, C and D of Example 13) in accordance with another embodiment of the present invention.

FIG. 13 shows the performance test results for unreduced catalyst B, which is seen to exhibit excellent selectivity especially at temperatures above about 275° C. It is believed that if Catalyst B were reduced as was the case with Catalysts C and D, that the CO conversion curve of FIG. 13 might well be shifted leftwardly, providing even better performance. Generally, it is believed that at Bi:Rh atomic ratios of about 0.7 or higher, reduction of the catalyst is more important for improving selectivity than is the case when the Bi:Rh atomic ratio is lower than 0.7 (as is the case with Catalyst B). With a Bi:Rh atomic ration of less than about 0.7, reduction of the catalyst does not appear to be needed for excellent performance. The excellent results obtained with unreduced Catalyst B (Bi:Rh atomic ration of 3.5) appear to bear this out. Reduction of catalysts in accordance with the present invention having Bi:Rh atomic ratios of about 0.7 or higher is not essential to practice of the present invention, but is believed to provide enhanced performance by such catalysts.

Figure 14:
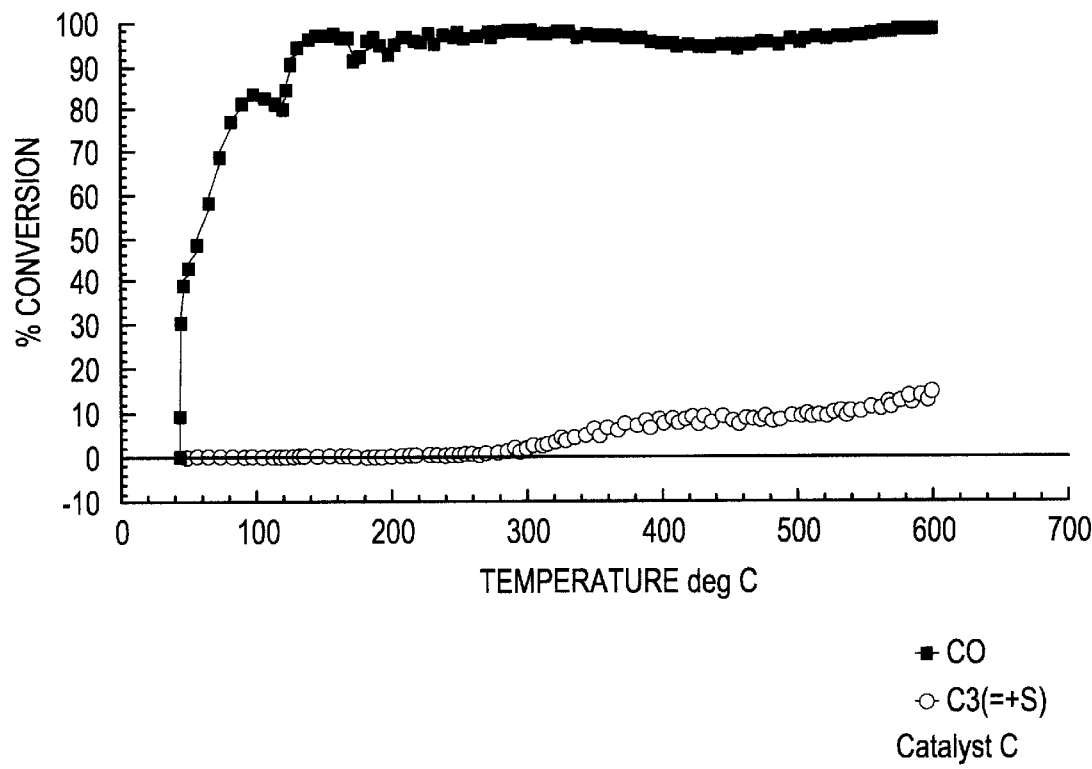
Figure 15:
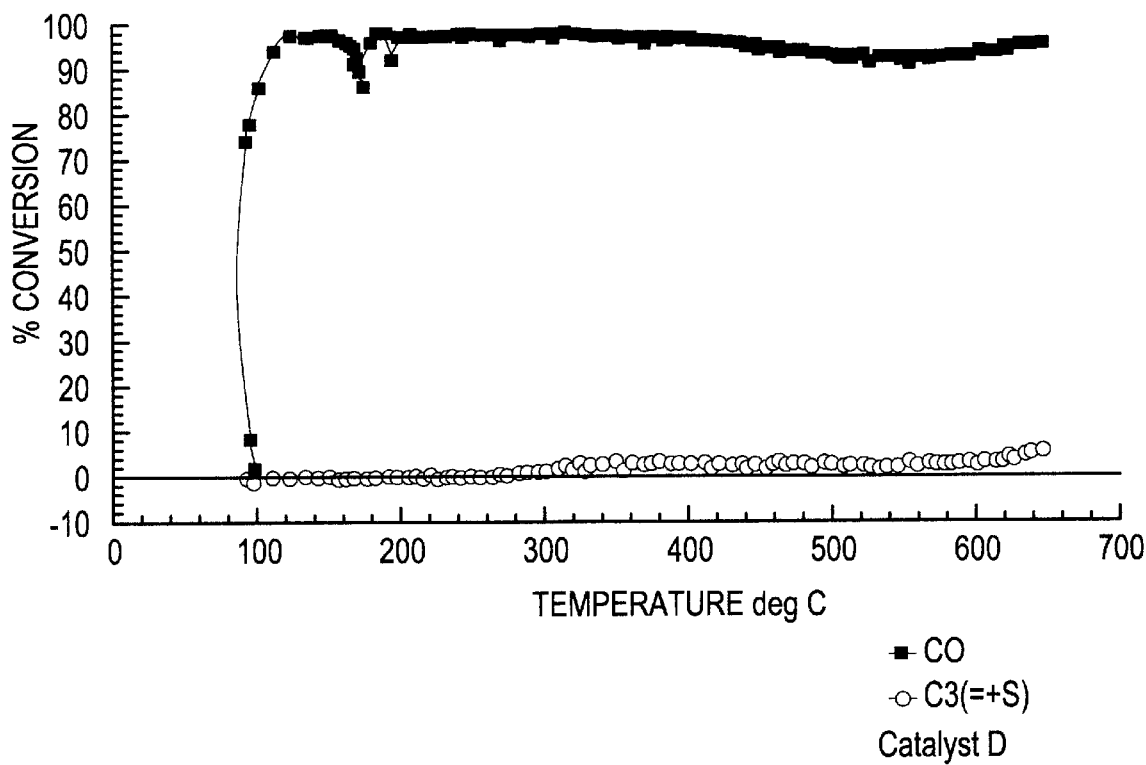

FIG. 14 shows the performance test results for reduced Catalyst C which demonstrates outstanding selectivity for carbon monoxide oxidation even at very low temperatures, e.g., starting at about 50° C. Similarly, FIG. 15, which shows the performance test results for reduced Catalyst D, also shows outstanding selectivity for the oxidation of carbon monoxide over a very wide temperature range of from about 100 to over 600° C.

Clearly, all three of the Catalysts B, C and D are highly selective for carbon monoxide oxidation in the presence of hydrocarbons. Essentially complete or ideal selectivity is achieved at a Bi:Rh atomic ratio of 0.7 (Catalyst D, FIG. 15). This is about one-half the Bi:Rh atomic ratio needed for a supported catalyst to achieve similar selectivity results, i.e., proportionally less bismuth is needed in an unsupported catalyst to achieve similar selectivities as compared to otherwise comparable supported versions of the catalytic material of the present invention.

Catalyst Characterization

Figure 16:
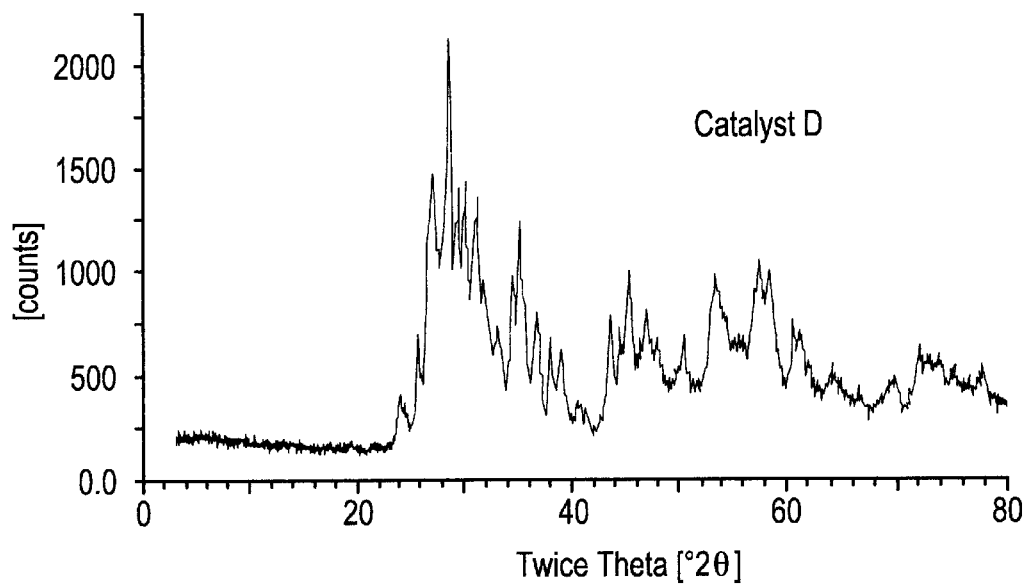
FIGS. 16 and 17 are X-ray diffraction spectra charts for, respectively, two co-precipitated catalysts (Catalysts D and E of Example 13) in accordance with embodiments of the present invention.
Figure 17:
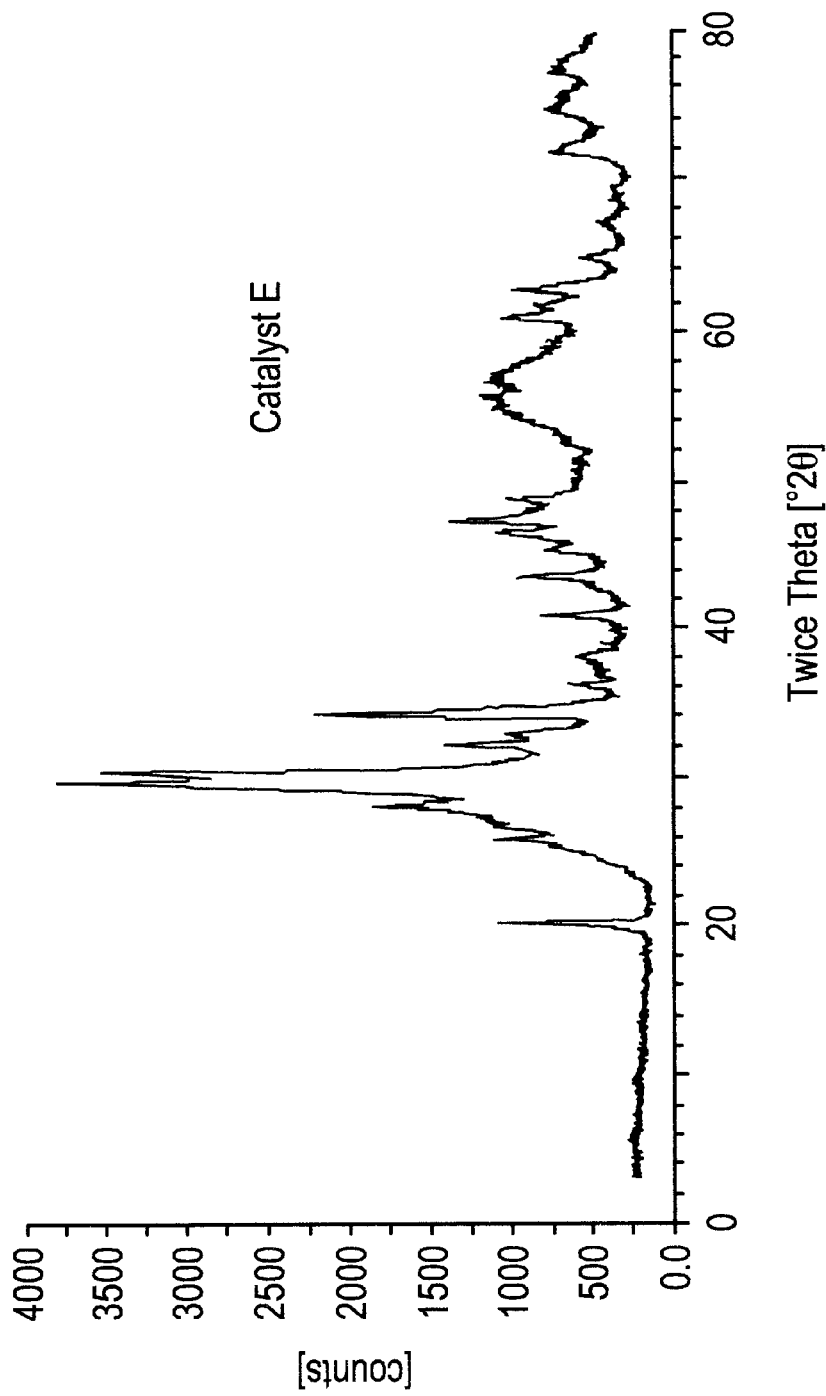

X-ray diffraction ("XRD") spectra were obtained for Catalyst D (Bi:Rh atomic ratio 0.7) and Catalyst E (Bi:Rh atomic ratio 1.3) and are shown in FIG. 16 for Catalyst D and in FIG. 17 for Catalyst E. The data were determined by standard X-ray diffraction techniques. The counts or intensity of the diffracted X-ray beam is presented on the vertical (Y) axis as a function of two times theta, which is presented on the horizontal (X) axis, where theta is the Bragg angle. A more detailed discussion of the X-ray diffraction technique employed is contained in the text *X-ray Structure Determination* by G. Stout and L. Jensen, Macmillan Publishing Co., Inc., New York, N.Y., 1968, Library of Congress Catalog Number 68-10385, the disclosure of which is 25 hereby incorporated herein. The XRD data indicate small amounts of $Bi_2O_3$ and $Rh_2O_3$ plus one or more Rh/Bi crystalline phases as well as some amorphous material.

Figure 18:
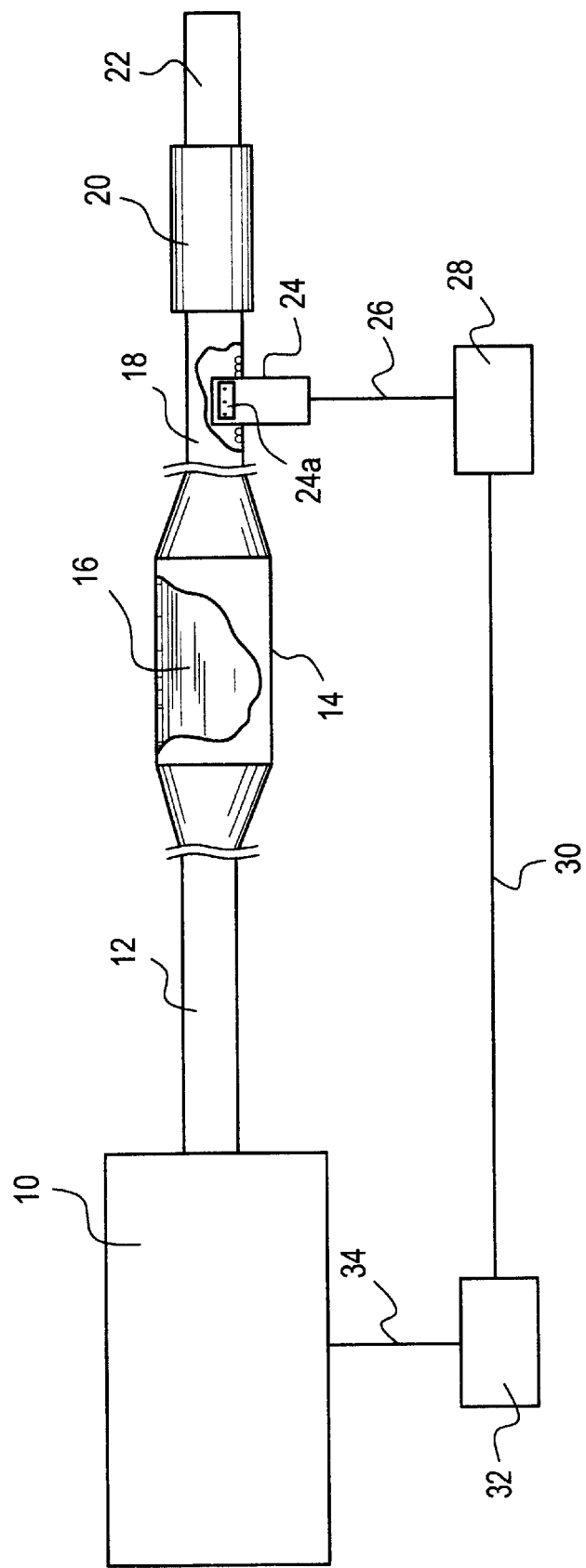
FIG. 18 is a schematic diagram showing one environment of use of the selective catalyst of the present invention in the exhaust line of an engine fueled by a hydrocarbonaceous fuel such as gasoline, diesel oil or natural gas.

Referring now to FIG. 18, there is shown a schematic illustration of one environment of use of the selective catalytic material of the present invention, disposed in the exhaust conduit of an internal combustion engine 10, from which engine exhaust is transmitted by exhaust conduit 12 to a catalytic converter 14 which is partially broken away to show a treatment catalyst 16 disposed therein. Treatment catalyst 16 may comprise a monolithic carrier, the gas flow channels of which (not shown) are disposed parallel to the longitudinal axis of exhaust conduit 12. The walls of the gas flow channels are coated with a suitable catalytic material of any known type. The catalytic material utilized in the treatment catalyst may be an oxidation catalyst, such as a platinum-on-alumina support, or it may be the type of catalyst known to those skilled in the art as a three-way conversion catalyst. A three-way conversion catalyst contains a catalytic material which promotes substantially simultaneous oxidation of hydrocarbons and carbon monoxide and reduction of nitrogen oxides. After passing through treatment catalyst 16, the treated exhaust gases pass through a transfer conduit 18, then through a conventional sound-deadening muffler 20, for discharge to the atmosphere via an exhaust pipe 22. The arrangement thus far described is conventional, showing the interposition of a catalytic converter into the exhaust gas discharge of, e.g., an automobile or diesel engine, in order to treat the exhaust gases to reduce the noxious pollutant content thereof prior to discharge to the atmosphere.

Transfer conduit 18 is broken away in FIG. 18 to better show the insertion of a sensor 24 therewithin so that a portion at least of sensor 24 contacts the treated exhaust gases exiting from treatment catalyst 16. Sensor 24 is connected via a first lead 26 to a sensor electronics package 28, which is in turn connected by a second lead 30 to engine control unit 32. Engine control unit 32 is connected by a third lead 34 to engine 10.

Sensor 24 has coated thereon an adherent layer of a rhodium- and bismuth-containing selective catalytic material 24a in accordance with an embodiment of the present invention.

Conventional means (not shown) within sensor 24 (which may be heated by, e.g., electric resistance coils (not shown) to control the temperature) transmit data concerning the amount of carbon monoxide oxidation carried out at catalytic material 24a to a transducer (not shown) from which transducer information is transmitted to first lead 26, thence to sensor electronics package 28. This information concerning the amount of carbon monoxide oxidation taking place at catalytic material 24a, optionally used in conjunction with other information concerning the conditions in the exhaust stream being treated, indicates the quality of the performance of treatment catalyst 16. That information may be relayed via second lead 30 to engine control unit 32, which transmits an appropriate operating signal via third lead 34 to engine 10, in order to adjust operation thereof. For example, in response to the signal from engine control unit 32, the air/fuel ratio of the fuel supply to the engine may be adjusted in order to enhance performance of treatment catalyst 16. If poor performance persists, catalytic converter 14 may have to be replaced.

The selective catalyst composition of the present invention has other uses, including utilization in carbon monoxide detectors now used in homes, offices and industrial plants, in order to detect the presence of carbon monoxide in the ambient atmosphere. In such case, the selective catalytic material would be disposed on a sensor, which may be electrically heated in order to attain a sufficiently high temperature for oxidation of carbon monoxide. The sensor is one having known electronic circuitry associated herewith to detect the amount of carbon monoxide oxidation effectuated at the catalyst and provide a signal indicating the content of carbon monoxide in the ambient atmosphere.

While the invention has been described in detail with respect to specific preferred embodiments thereof, it is to be understood that upon a reading of the foregoing description, variations to the specific embodiments disclosed may occur to those skilled in the art and it is intended to include such variations within the scope of the appended claims.

What is claimed is:

1. A selective catalytic material for selectively oxidizing carbon monoxide in a gas stream containing a hydrocarbon component in addition to the carbon monoxide, the catalytic material consisting essentially of (i) a catalytically effective amount of a rhodium component, (ii) a bismuth component, and (iii) optionally a catalytically effective amount of one or more platinum group metals other than rhodium, wherein the bismuth component is present in an amount sufficient to inhibit oxidation of a hydrocarbon component contained in a gas stream also containing carbon monoxide relative to an otherwise identical material which does not contain the bismuth component, when the selective catalytic material is contacted under oxidizing conditions with such gas stream.

2. The selective catalytic material of claim 1 wherein the catalytic material is unsupported.

3. The selective catalytic material of claim 2 wherein the rhodium and the bismuth component are combined in a co-precipitate obtained from a solution of a soluble bismuth salt and a soluble rhodium salt, and the co-precipitate has been calcined in an oxidizing gas at a temperature of at least about 750° C.

4. The selective catalytic material of claim 3 wherein the solution is an aqueous solution, the co-precipitate is obtained by evaporating the solution to dryness, and the co-precipitate is calcined at a temperature of from about 750° C. to 950° C.

5. A selective catalytic material for selectively oxidizing carbon monoxide in a gas stream containing a hydrocarbon component in addition to the carbon monoxide, the catalytic material consisting essentially of:

(a) a refractory inorganic oxide support;

(b) a catalytically effective amount of a rhodium component, the rhodium component being dispersed on the support;

(c) a bismuth component dispersed on the support;

(d) and optionally, a catalytically effective amount of one or more platinum group metals other than rhodium dispersed on the support;

wherein the bismuth component is present in an amount sufficient to inhibit the oxidation of a hydrocarbon component contained in a gas stream also containing carbon monoxide relative to an otherwise identical catalytic material which does not contain the bismuth component, when the selective catalytic material is contacted under oxidizing conditions with such gas stream.

6. The selective catalytic material of any one of claims 1 through 5 wherein the bismuth component and the rhodium are present in amounts that provide an atomic ratio of bismuth to rhodium in the range of from about 0.1:1 to 10:1.

7. The selective catalytic material of claim 6 wherein the atomic ratio of bismuth to rhodium is in the range of from about 0.5:1 to 4:1.

8. The selective catalytic material of claim 6 wherein the atomic ratio of bismuth to rhodium is in the range of from about 1:1 to 2.5:1.

9. The selective catalytic material of claim 1, claim 2, claim 3 or claim 5 further comprising a catalytically effective amount of a platinum group metal component selected from the group consisting of one or more platinum group metals other than rhodium.

10. The selective catalytic material of claim 1, claim 2, claim 3 or claim 5 further comprising a catalytically effective amount of platinum.

11. The selective catalytic material of claim 5 wherein the bismuth component, calculated as elemental bismuth, comprises at least about 0.01 percent by weight of the catalytic material.

12. The selective catalytic material of claim 11 wherein the bismuth component comprises from about 0.01 to about 50 percent by weight of the catalytic material.

13. The selective catalytic material of claim 11 wherein the bismuth component comprises from about 1 to about 30 percent by weight of the catalytic material.

14. The selective catalytic material of claim 5 wherein the atomic ratio of bismuth to rhodium is from about 0.5:1 to 4:1 and the rhodium comprises from about 0.5 to 15 percent by weight of the catalytic material.

15. The selective catalytic material of claim 5 wherein the refractory inorganic oxide support is selected from the group consisting of zirconia, stabilized zirconia, ceria, stabilized ceria, titania, alumina, stabilized alumina, silica-alumina and silica.

16. The selective catalytic material of claim 5 wherein the refractory inorganic oxide support is selected from the group consisting of zirconia and stabilized zirconia.

17. The selective catalytic material of claim 5 wherein the rhodium and the bismuth component are dispersed on the same increment of the refractory inorganic oxide support.

18. The selective catalytic material of any one of claims 1 through 5 wherein the bismuth component comprises $Bi_2O_3$.

19. The selective catalytic material of claim 5 made by a process of dispersing the rhodium and the bismuth component on the support and then calcining the support in an oxidizing gas at a temperature of from about 750° C. to 950° C.

* * * * *